United States Patent [19]
Ishikawa et al.

[11] Patent Number: 6,000,444
[45] Date of Patent: Dec. 14, 1999

[54] METHOD AND APPARATUS FOR FILLING BULK MATERIAL

[75] Inventors: Takao Ishikawa; Sigeru Akezawa; Nobuo Miyazaki; Takahiro Shinagawa, all of Tokyo, Japan

[73] Assignee: Kao Corporation, Tokyo, Japan

[21] Appl. No.: 09/077,883

[22] PCT Filed: Dec. 3, 1996

[86] PCT No.: PCT/JP96/03532

§ 371 Date: Jun. 10, 1998

§ 102(e) Date: Jun. 10, 1998

[87] PCT Pub. No.: WO97/21590

PCT Pub. Date: Jun. 19, 1997

[30] Foreign Application Priority Data

Dec. 12, 1995 [JP] Japan .................................. 7-346132
Jul. 9, 1996 [JP] Japan .................................. 8-196982

[51] Int. Cl.⁶ ..................................................... B65B 1/04
[52] U.S. Cl. .............................. 141/83; 141/192; 141/95
[58] Field of Search .............................. 141/83, 95, 192, 141/198, 1

[56] References Cited

U.S. PATENT DOCUMENTS

| | | | |
|---|---|---|---|
| 4,621,664 | 11/1986 | Pryor et al. ................................. | 141/83 |
| 5,148,841 | 9/1992 | Graffin ....................................... | 141/83 |
| 5,287,896 | 2/1994 | Graffin ....................................... | 141/83 |

FOREIGN PATENT DOCUMENTS

| | | |
|---|---|---|
| 0 032 481 | 7/1981 | European Pat. Off. . |
| 54-113362 | 9/1979 | Japan . |
| 58-52001 | 3/1983 | Japan . |

*Primary Examiner*—Steven O. Douglas
*Attorney, Agent, or Firm*—Oblon, Spivak, McClelland, Maier & Nuestadt, P.C.

[57] ABSTRACT

A method and apparatus for filling bulk material, in which an objective filling weight for filling bulk material stored in a storage portion of a filling object is divided to a first stage objective filling weight and a second a second stage objective filling weight. The method consists of setting an opening/closing mechanism provided on the storage portion to a predetermined opening degree and filling the bulk material from the storage portion to the filling object until the first stage objective filling weight is reached, and then activating the opening/closing mechanism so as to close from the predetermined opening degree. A closing travel distance of the opening/closing mechanism in a certain minute time interval, and a filling weight of bulk material are then detected, and based on these detected values, the fluidity of the bulk material in such a minute time interval is calculated. A closing travel distance and a closing travel speed of the opening/closing mechanism in a next minute time interval is then calculated based on the fluidity so as to activate the opening/closing mechanism to close thereby filling the bulk material to the filling object until the objective filling weight is reached.

6 Claims, 20 Drawing Sheets

F I G. 7
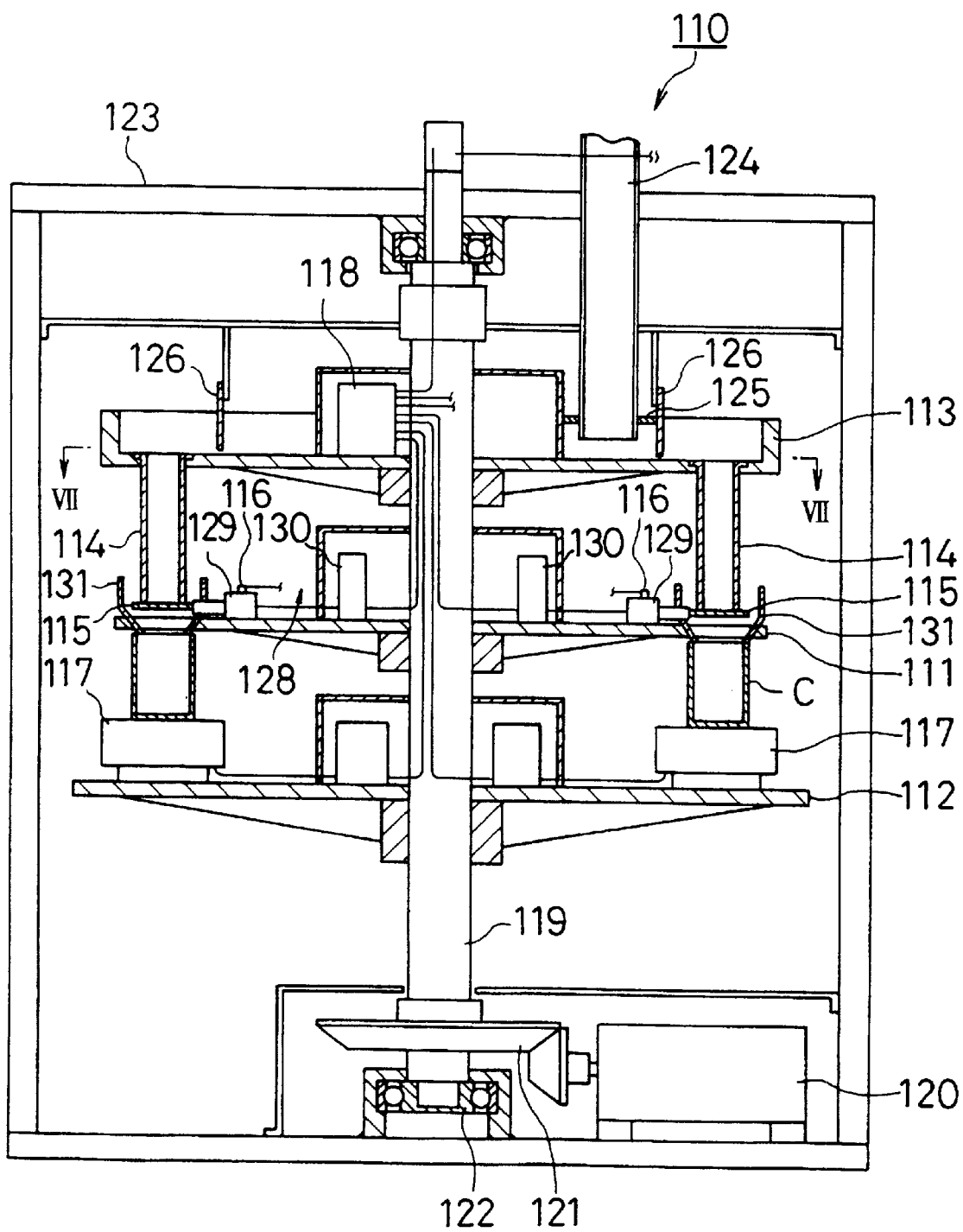

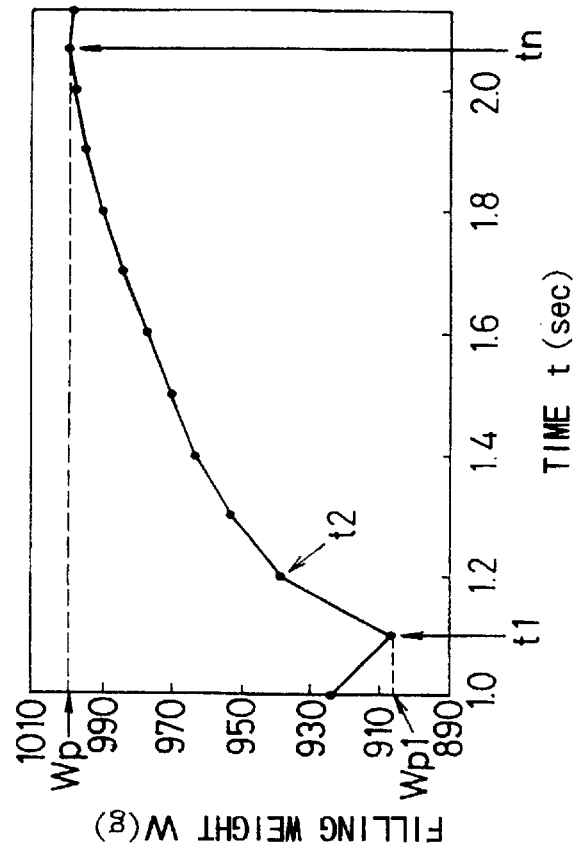
F I G. 14(b)
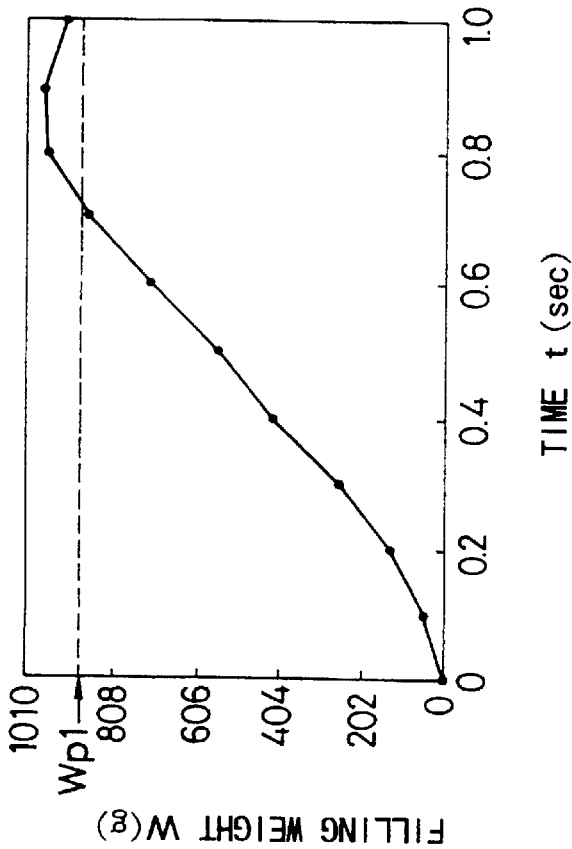
F I G. 14(a)

METHOD AND APPARATUS FOR FILLING BULK MATERIAL

FIELD OF THE INVENTION

This invention relates to a method and an apparatus for filling bulk (powder and grain) material to a filling object such as a container and the like.

BACKGROUND OF THE INVENTION

Examples of related bulk material filling apparatuses have been disclosed in Japanese Patent Application Laid-Open No. (JP-A) 113362/79 (first related art) and Japanese Patent Application Laid-Open No. (JP-A) 52001/83 (second related art).

According to the first related art, first the volume of bulk material is measured with a massive filling measure and its weight thereof is measured with a measuring device. Then, the bulk material is poured continuously in a small quantity through a small hole and when the poured amount reaches an objective filling value, the small hole is closed such that the filling operation is completed.

According to the second related art, the weight of a package product in which its filling of bulk material is completed is measured with a weight checker and the tendency in the supply amount thereof from a cup measuring device is controlled. At the same time, a bulk material surface detecting device is provided on the hopper and according to signals output from this detecting device, the amount of bulk material flowing into the hopper is adjusted.

However, the related arts have the following problems.

(1) In the first related art, the small throw-in of the bulk material is conducted using the small holes, thus if the characteristics of powder change, the fluidity thereof is affected. Thus, if the fluidity thereof is deteriorated, the powder falling time is prolonged thereby reducing the filling accuracy.

(2) In the second related art, a result of measured weight of the package product after the filling is completed is fed back to the next filling operation. The flow rate cannot be compensated at real time. Thus, in this second related art as well, if the fluidity of bulk material changes, a high precision filling cannot be conducted.

(3) In both the first and second related arts, when the throw-in is terminated, the amount of bulk material (called falling amount Wh) existing in the air (falling height) from just below the outlet of a storage portion closed by the opening/closing device up to a filling object is considered. It is necessary to control the opening/closing device at a timing in which the filling weight W of bulk material filled in the filling object reaches $W=W_0-Wh$ ($W_0$: objective amount). However, the falling height of bulk material varies depending on the size of a container which is the filling object. Thus, it is necessary to change the closing timing of the opening/closing device for every container size, so that a time required for changing a product type increases.

SUMMARY OF THE INVENTION

Accordingly, an object of the present invention is to provide a method for filling bulk material to a filling object rapidly and at a high precision.

The present invention provides for a method for filling bulk material, wherein after the bulk material is filled into a measure and the bulk material in the measure is massively thrown into a container, the throw-in amount of the bulk material per unit time is adjusted to be substantially constant so as to conduct additional throw-in thereof. The additional throw-in amount thereof is approximated linearly with respect to time and then the additional throw-in is stopped based on the approximation line and a predetermined filling weight.

Further according to the present invention, there is provided an apparatus for filling bulk material, comprising: a measure to be filled with the bulk material; a filling means for filling the bulk material to the measure; a throw-in means for throwing the bulk material filled in the measure to a container; a transportation means having a measuring device, for carrying the container; and a control unit for approximating the additional throw-in amount thereof linearly with respect to time and activating the throw-in means based on the approximated line and a predetermined filling weight.

Still further according to the present invention, there is provided a method for filling bulk material, in which an objective filling weight for filling bulk material stored in a storage portion to a filling object is divided to a first stage objective filling weight and a second stage objective filling weight and which comprises:

a first stage filling step in which an opening/closing mechanism provided on the storage portion is set to a predetermined opening degree and the bulk material is filled from the storage portion to the filling object until the first stage objective filling weight is reached; and a second stage filling in which the opening/closing mechanism is activated so as to close from the specified opening degree, a closing travel distance of the opening/closing mechanism in a certain minute time interval and a filling weight of bulk material are detected, and based on such detected values, a fluidity of the bulk material in such a minute time interval is calculated; and a closing travel distance and a closing travel speed of the opening/closing mechanism in a next minute time interval are calculated based on the fluidity so as to activate the opening/closing mechanism to close thereby filling the bulk material to the filling object until the objective filling weight is reached.

Further according to the present invention, there is provided an apparatus for filling bulk material comprising:

a storage portion for storing bulk material;

an opening/closing mechanism disposed on the storage portion, for continuously adjusting the supply amount of the bulk material to be supplied from the storage portion to a filling object by an opening/closing action;

a travel distance detecting device for detecting an opening/closing travel distance of the opening/closing device;

a weight detecting device for detecting a filling weight of the bulk material to be filled into the filling object; and a control unit for controlling the opening/closing operation of the opening/closing mechanism;

the control unit controlling according to a first stage filling step in which an opening/closing mechanism is set to a predetermined opening degree and the bulk material is filled from the storage portion to the filling object until the first stage objective filling weight is reached; and a second stage filling in which the opening/closing mechanism is activated so as to close from the specified opening degree, and a fluidity of the bulk material in such a minute time interval is calculated from a closing travel distance of the opening/closing mechanism and a filling weight of the bulk material, which are detected by the travel distance detecting device and the weight detecting device in a certain minute time interval;

a closing travel distance and a closing travel speed of the opening/closing mechanism in a next minute time interval are calculated based on the fluidity so as to activate the opening/closing mechanism to close thereby filling the bulk material to the filling object until the objective filling weight is reached.

Further, according to the present invention, there is provided a method for filling bulk material, for filling the bulk material stored in the storage portion to the filling object by means of controlling the opening/closing operation of the opening/closing device disposed in the storage portion and filling a specified initial filling amount at the massive throw-in stage, and then filling a remaining filling amount at the small throw-in stage thereby completing filling up to an objective filling weight ($W_0$), the method comprising:

measuring a fall time (tτ) of the bulk material from an outlet opening of the storage portion to the filling object at the massive throw-in stage;

measuring a flow rate (q) of the bulk material poured from the storage portion at the small throw-in stage;

calculating a falling amount (Wh) thereof existing in the air from just below the outlet opening of the storage portion closed by the opening/closing device up to the filling object according to Wh=q×tτ at the small throw-in stage; and determining a timing in which the filling amount (W) of the bulk material filled in the filling object at the small throw-in stage reaches $W=W_0-Wh$ to be a closing timing of the opening/closing device.

Further according to the present invention, there is provided a method for filling bulk material wherein a fall time of the bulk material for use in calculation of the falling amount is an average of fall times measured in just nearby N cycle filling operation.

Further according to the present invention, there is provided an apparatus for filling bulk material comprising:

a storage portion for storing the bulk material;

an opening/closing device disposed on the storage portion for opening/closing the outlet opening of the storage portion;

a weight detecting device for detecting a filling weight of the bulk material supplied from the storage portion to a filling object; and a control unit for controlling the opening/closing operation of the opening/closing device, filling a specified initial filling amount at the massive throw-in stage, and then filling a remaining filling amount at the small throw-in stage thereby completing filling up to an objective filling weight ($W_0$);

the control unit receiving a result of detection from the weight detecting device and calculating a falling amount (Wh) existing in the air from just below the outlet opening of the storage portion closed by the opening/closing device up to the filling object at the small throw-in stage according to Wh=q×tτ, by measuring the fall time (tτ) of the bulk material from the outlet opening of the storage portion to the filling object at the massive throw-in stage, and further measuring a flow rate (q) of the bulk material poured from the storage portion at the small throw-in stage, and further determining a timing in which the filling amount (W) of the bulk material filled in the filling object at the small throw-in stage reaches $W=W_0-Wh$ to be a closing timing of the opening/closing device.

Further, according to the present invention, there is provided an apparatus for filling bulk material wherein a fall time of the bulk material for use in calculation of the falling amount is an average of fall times measured in just nearby N cycle filling operation.

According to the invention described above, the following operation (1) is attained.

(1) Because after the bulk material is filled into a measure and the bulk material in the measure is massively thrown into a container, the throw-in amount of the bulk material per unit time is adjusted to be substantially constant so as to conduct additional throw-in thereof, the additional throw-in amount thereof is approximated linearly with respect to time and then the additional throw-in is stopped based on the approximation line and a predetermined filling weight, and the filling accuracy of the bulk material into the container is enhanced.

According to the invention described above, the following operation (2) is also attained.

(2) Because in the first stage filling step, the opening/closing mechanism is opened to a predetermined opening degree and the bulk material can be filled to the filling object until the first stage objective filling weight is reached, the bulk material can be filled rapidly.

In the second stage filling, the opening/closing mechanism is activated so as to close from the specified opening degree, and based on a closing travel distance of the opening/closing mechanism in a certain minute time interval and a filling weight of bulk material, a fluidity of the bulk material in such a minute time interval is calculated and measured, and further a closing travel distance and a closing travel speed of the opening/closing mechanism in a next minute time interval are calculated based on this fluidity so as to activate the opening/closing mechanism to close thereby filling the bulk material to the filling object. As described above, while the bulk material is being filled, the fluidity thereof is calculated and measured at real time and based on this fluidity, the opening degree of the opening/closing mechanism is controlled so as to determine the full closing timing of the opening/closing mechanism, therefore it is possible to reduce the amount (falling amount) of bulk material existing between the opening/closing mechanism and the filling object when the opening/closing mechanism is fully closed, thereby realizing a high precision filling.

According to the invention described above, the following operations (3), (4) are also attained.

(3) Because at the massive throw-in stage, the opening/closing device is opened at a specified opening degree so that bulk material can be thrown massively into the filling object up to a specified initial filling level, the bulk material can be filled rapidly.

(4) At the small throw-in stage, the falling amount (Wh) of bulk material existing in the air (falling height) from just below the outlet opening of the storage portion closed by the opening/closing device up to the filling object is calculated and the opening/closing device is controlled so as to be closed at a timing in which the filling amount (W) of the bulk material filled in the filling object reaches $W=W_0-Wh$. While the bulk material is being filled, the falling time and flow rate of the bulk material are measured at real time and based on this measuring result, the closing timing of the opening/closing device is determined. Thus, a high precision filling can be achieved without being affected by a change of the characteristics of the bulk material and a necessity for a time required for changing filling object types.

According to the invention described above, the following operation (5) is also attained.

(5) Because a fall time of the bulk material for use in calculation of the falling amount is an average of fall times measured in just nearby N cycle filling operation, the filling accuracy can be improved.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings, wherein:

FIG. 6(a) is a diagram of a sectional view of a major section showing that bulk material is filled in each measure, FIG. 6(b) is a sectional view of the major section showing a state in which a massive throwing-in is being conducted, FIG. 6(c) is a sectional view of the major section showing an intermediate state (stabilized state) between the massive throwing-in and an additional throwing-in, FIG. 6(d) is a sectional view of the major section showing a state in which an additional throwing-in is being conducted, FIG. 6(e) is a sectional view of the major section showing a state in which the additional throwing-in is completed, and FIG. 6(f) is a sectional view of the major section showing a state in which bulk material is filled in the measure;

FIG. 7 is a longitudinal sectional view of a rotary type filling apparatus to which the second embodiment of the bulk material filling control unit according to the present invention is applied;

FIGS. 14(a) and 14(b) are graphs showing a relationship between the filling weight of bulk material and time;

BEST PRACTICAL MODES OF THE INVENTION

First Embodiment

Figure 1:
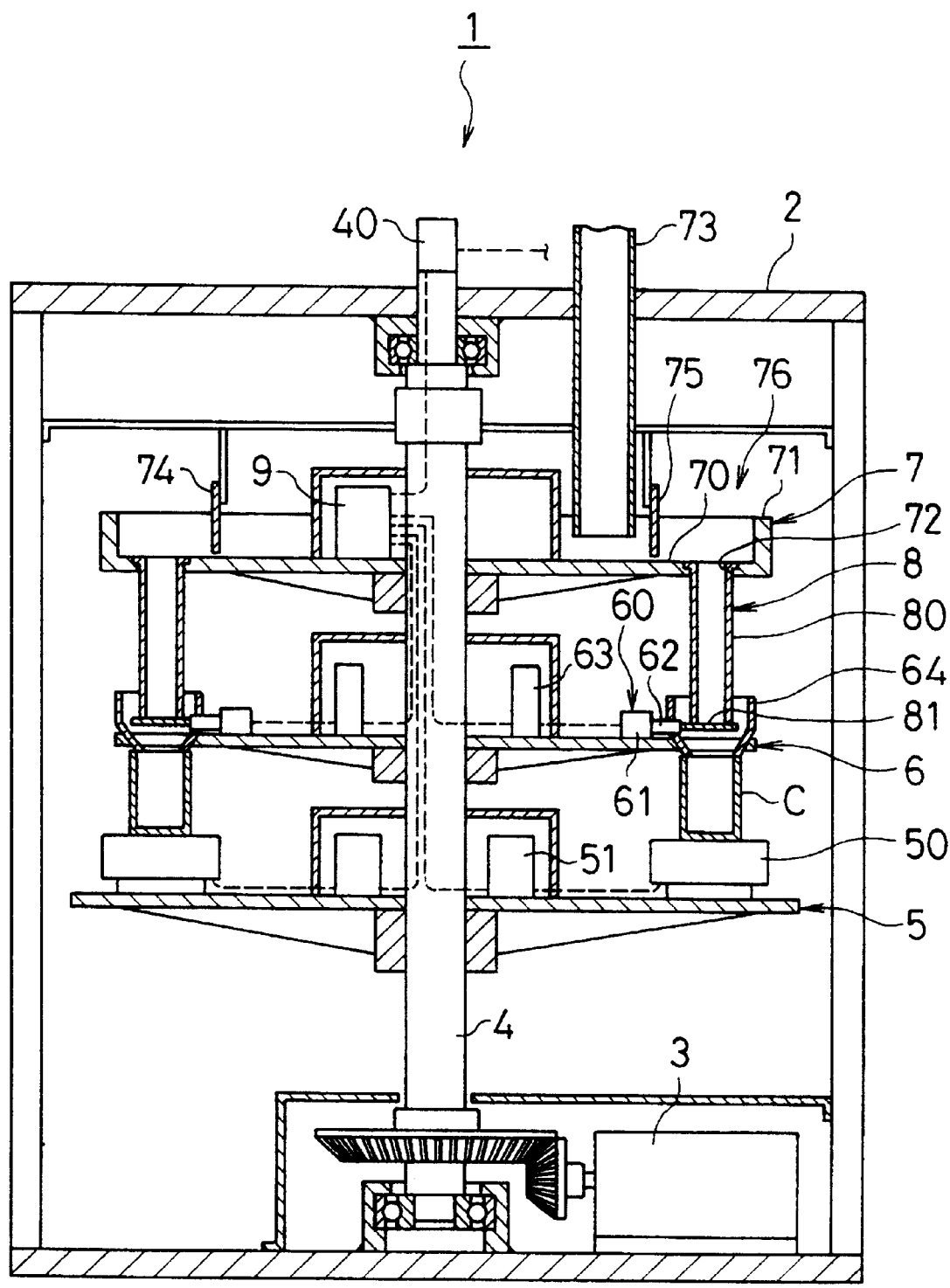
FIG. 1 is a side sectional view showing an embodiment of a filling apparatus for filling bulk material to a container according to the present invention.
Figure 2:
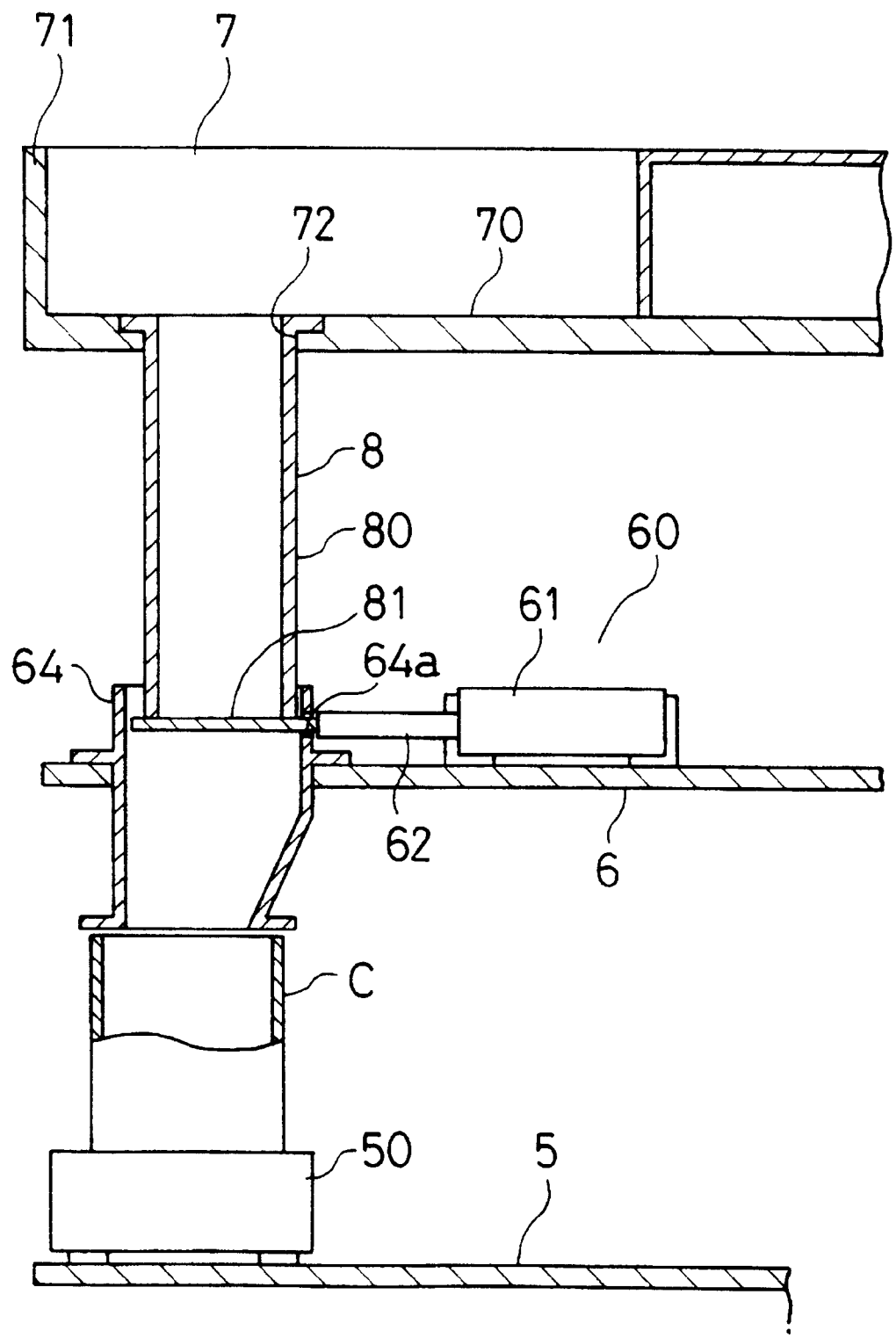
FIG. 2 is a side sectional view of an enlarged major portion of FIG. 1.
Figure 3:
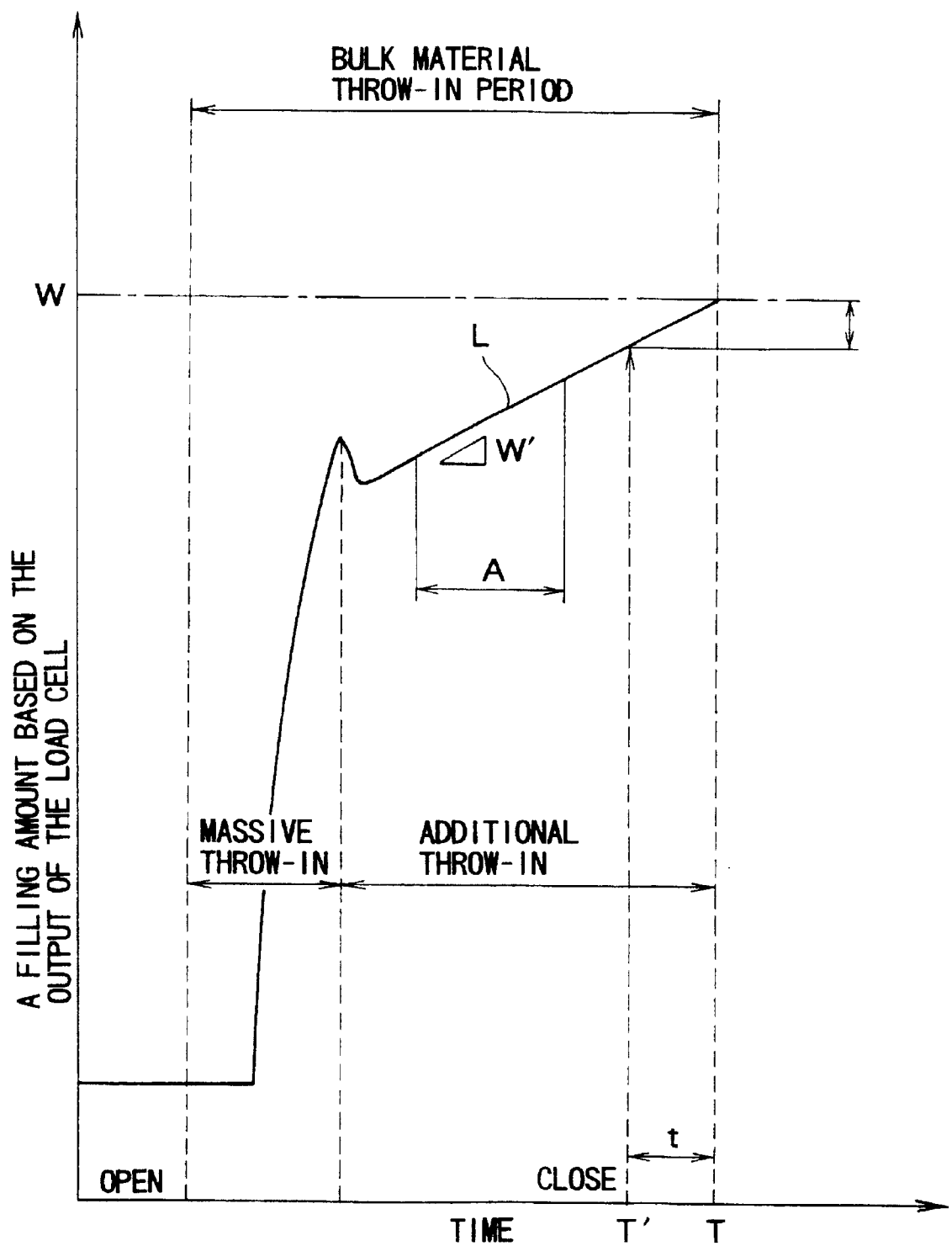
FIG. 3 is a diagram showing a relationship between the filling amount of bulk material based on the output of a load cell base in the filling apparatus and time according to the first embodiment.

Referring now to the drawings, wherein like reference numerals designate identical or corresponding parts throughout the several views, FIGS. 1–3 show a rotary type bulk material continuous filling apparatus of an embodiment of a filling apparatus for filling bulk material to a container according to the present invention. Referring to these Figures, reference numeral 1 denotes a rotary type bulk material continuous filling apparatus (hereinafter referred to as bulk material filling apparatus) and symbol C denotes a container.

As shown in FIG. 1, the bulk material filling apparatus 1 comprises a motor 3 loaded with a speed reducing unit, a driving shaft 4 which is rotated around its vertical axis by the motor 3 through bevel gears, a turn table (carrying means) 5 insertedly fixed to the driving shaft 4, a cylinder base 6 insertedly fixed to the driving shaft 4 above the turn table 5 and a turret base 7 insertedly fixed to the driving shaft 4 above the cylinder base 6 in a frame main body 2, respectively. A slip ring 40 is fitted to the upper end of the driving shaft 4 so as to supply electric power to a sequencer 9 described later.

Load cell bases (measures) 50 are disposed on the turn table 5 so as to be able to measure weight of a container C being carried by converting the distortion amount of the load cell (not shown) of the load cell base 50 to a weight. The output of the load cell 50 is amplified by a load cell amplifier 51 and then supplied to the sequencer (control section) 9 such that the container C being carried and the amount of bulk material filled within the container C can be monitored successively. The turn table 5 is provided with a supplying star wheel 52 for supplying a container C to the turn table 5 and a disfilling star wheel 53 for distilling the container 5 from the turn table 5 (see FIG. 5)

An electric piston cylinder mechanism (throw-in means) 60 is disposed on the cylinder base 6. This electric piston cylinder mechanism 60 has a servo motor 61 and a rod 62 which is activated by the servo motor 61. The servo motor 61 is controlled by the sequencer 9 described later through a motor driver 63 so as to control the opening/closing of a shutter 81 of a measure 8 described later thereby adjusting the throw-in amount of bulk material. Cylindrical guides 64 are disposed on the peripheral portion of the cylinder base 6 so as to enhance the sealing between the shutter 81 and the container C, thereby suppressing flying of bulk material at the time of massive throw-in. The guide 64 includes a window 64a (FIG. 2) which enables the shutter 81 to move back and forth.

The turret base 7 has a rising wall portion 71 (FIG. 2) which rises upward at the exterior peripheral portion of a base portion 70 which is of a circular shape as viewed on the plan. In the base portion 70, holes 72 for the measure 8 described later are formed such that bulk material is filled into the measure 8 through this hole 72.

Above the turret base 7, a bulk material supplying cylinder 73 for supplying bulk material onto the turret base 7 is supported by the frame main body 2. In the intermediate portion in the radius direction of the base portion 70, semi-circular guides 74, 75 are supportedly fixed by the frame main body 2 through supporting means (not shown). The guide 74 holds bulk material supplied from the bulk material supplying cylinder 73 within a specified area of the base portion 70 and cuts the upper face of bulk material filled in the measure 8 so as to be flush with the surface of the base portion 70 as the turret base 7 rotates. The guide 75 holds bulk material aside of the peripheral portion of the base portion 70. Here, the turret base 7, the bulk material supplying cylinder 73 and the respective guides 74, 75 constitute a throw-in means 76.

The turret base 7 includes the measures 8 insertedly disposed thereon. Each of the measures 8 comprises a cylindrical sleeve 80 which is its body and the shutter 81 which is its bottom portion. The shutter 81 is connected to the rod 62 of the electric piston cylinder mechanism 60 and reciprocated by the back and forth movement of the rod 62 so as to open/close the bottom opening portion of the sleeve 80.

The sequencer 9 is mounted substantially in the center portion of the turret base 7. The sequencer 9 monitors the filling amount of bulk material in the container C based on the output from the load cell 50 and dispatches an operation command for closing the shutter 81 to the servo motor 61 of the electric piston cylinder mechanism 60 based on the output of the load cell base 50.

The operation command of the servo motor 61 by the sequencer 9 based on the output of the load cell base 50 is dispatched as shown in FIG. 3. That is, first the shutter 81 of the measure 8 is moved to open the bottom portion of the measure 8 to throw in massively bulk material stored in the measure 8 up to about 70% relative to a predetermined filling amount W. Next, the extent of the opening of the measure 8 by the shutter 81 is narrowed after this massive throw-in and then bulk material is additionally thrown in with a throw-in amount per unit time W' substantially fixed. According to real-time output from the load cell base 50, the additional throw-in amount is approximated linearly and then based on this approximated line L and the set filling amount W, the filling complete time T by additional throw-in is calculated by arithmetic operation. At T' obtained by subtracting t needed for bulk material to be additional thrown in to reach the container C from the measure 8 from this filling complete time T, the shutter 81 is closed to stop additional throw-in, so that bulk material of the set filling amount W is filled in the container C. Here, an interval (time) A in which the additional throw-in amount is approximated linearly relative to time is 0.2–1.0 seconds or preferably 0.5–0.6 seconds.

Figure 4:
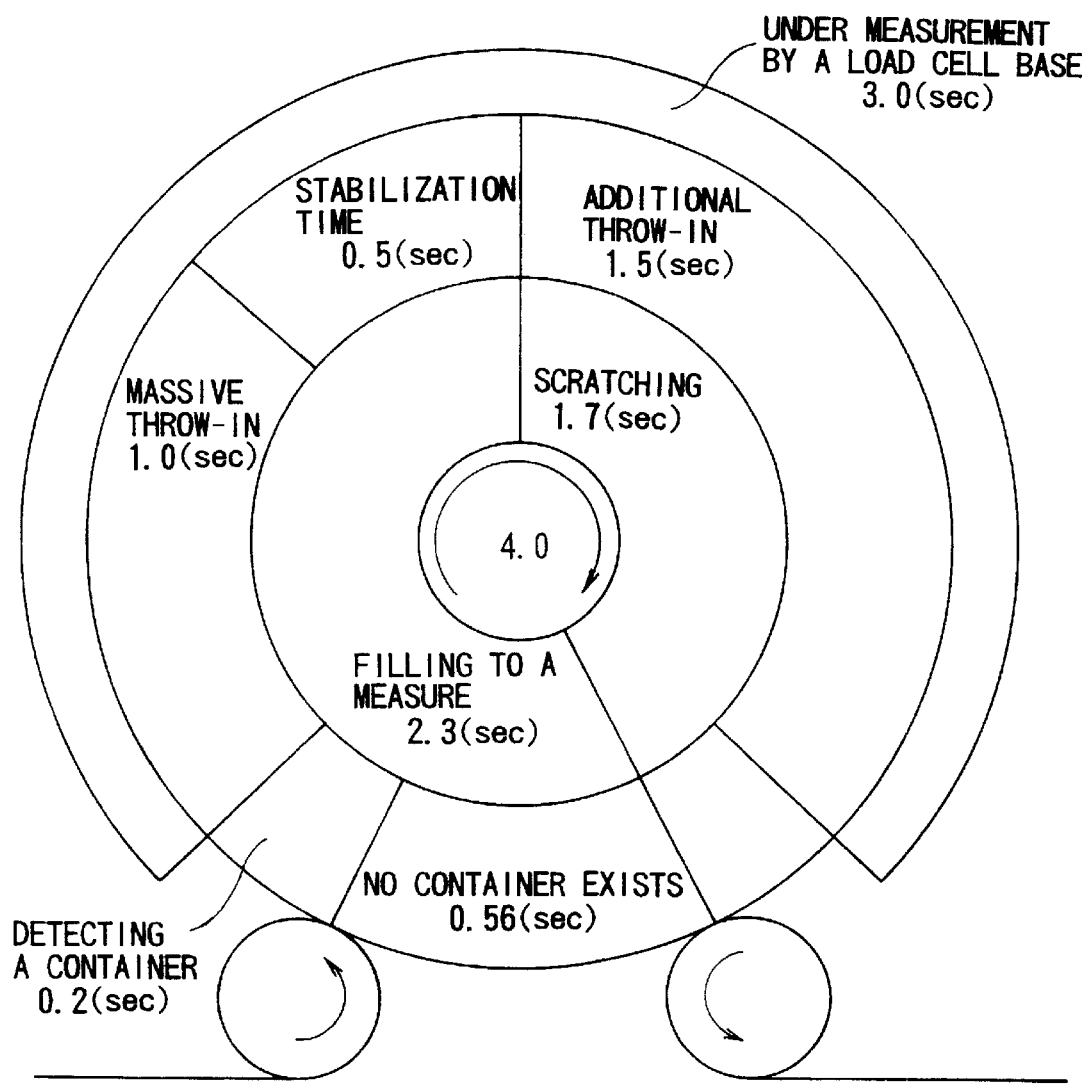
FIG. 4 is a time table showing a filling process according to the first embodiment of the filling method for filling bulk material to a container according to the present invention.

Next, the means of the filling method for filling bulk material to a container according to the present invention will be described with reference to a time chart shown in FIG. 4 and FIGS. 5, 6 based on the execution of the bulk material filling apparatus 1. The description below will be represented based on a single unit of the measure 8. The unit of numeric values in FIG. 4 is seconds.

First, empty containers C are carried by means of a transportation conveyor 100 and a pitch adjusting device 101 and loaded on the load cell 50 of the turn table 5 by the supplying star wheel 52. When 0.2 seconds pass after the container C is loaded on the load cell base 50, monitoring of a measured value by the load cell base 50 which is conducted by the sequencer 9 is started. In the upstream of this container, bulk material is always being filled into the measure 8 (see FIGS. 4, 5 and 6(a)).

Next, after the container C is loaded on the load cell base 50, the servo motor 61 is activated by an operation command from the sequencer 9 such that the shutter 81 is moved to open the bottom end of the measure 8 for a second. Then, about 70% the predetermined filling amount W of bulk material filled in the measure 8 is massively thrown into the container C (see FIGS. 4, 5 and 6(b)).

After the massive throw-in of bulk material, the shutter 81 is moved by an operation command from the sequencer 9 such that the opening state of the measure 8 is narrowed. In this interval of 0.5 seconds, the vibration of the load cell base 50 is stabilized, the top end of bulk material in the measure 8 is cut by the guide 74 and a further supply of bulk material into the measure 8 is restricted. Then, the throw-in amount of bulk material per unit time is made substantially constant and additional throw-in of the bulk material is conducted for 1.5 seconds. During this time, in the sequencer 9, the additional throw-in amount of the bulk material based on the real-time output of the load cell base 50 is approximated linearly. Then, the sequencer 9 calculates the time T up to a completion of the filling by the additional throw-in based on this approximated line L and the predetermined filling amount W by arithmetic operation. Then, the shutter 81 is closed at T' obtained by subtracting time t in which bulk material thrown in additionally reaches the container C from the measure 8, from this time T up to the completion of the filling, so as to stop the additional throw-in, such that the predetermined filling amount W of bulk material is filled into the container C (see FIGS. 4, 5, 6(d), (e)).

Figure 5:
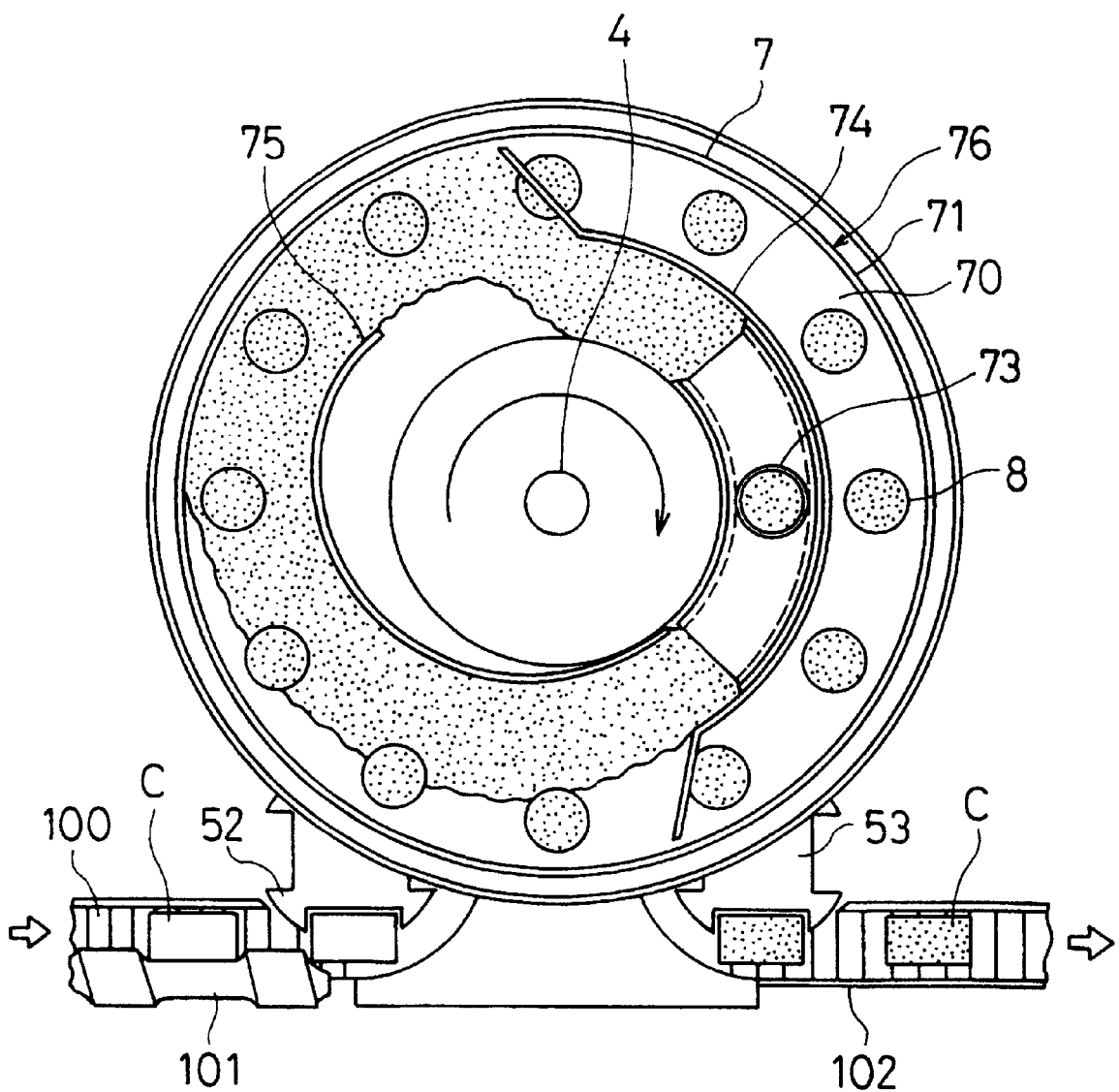
FIG. 5 is a plan sectional view of a major section showing a filling process for filling bulk material to a container with the filling apparatus according to the first embodiment.
Figure 6:
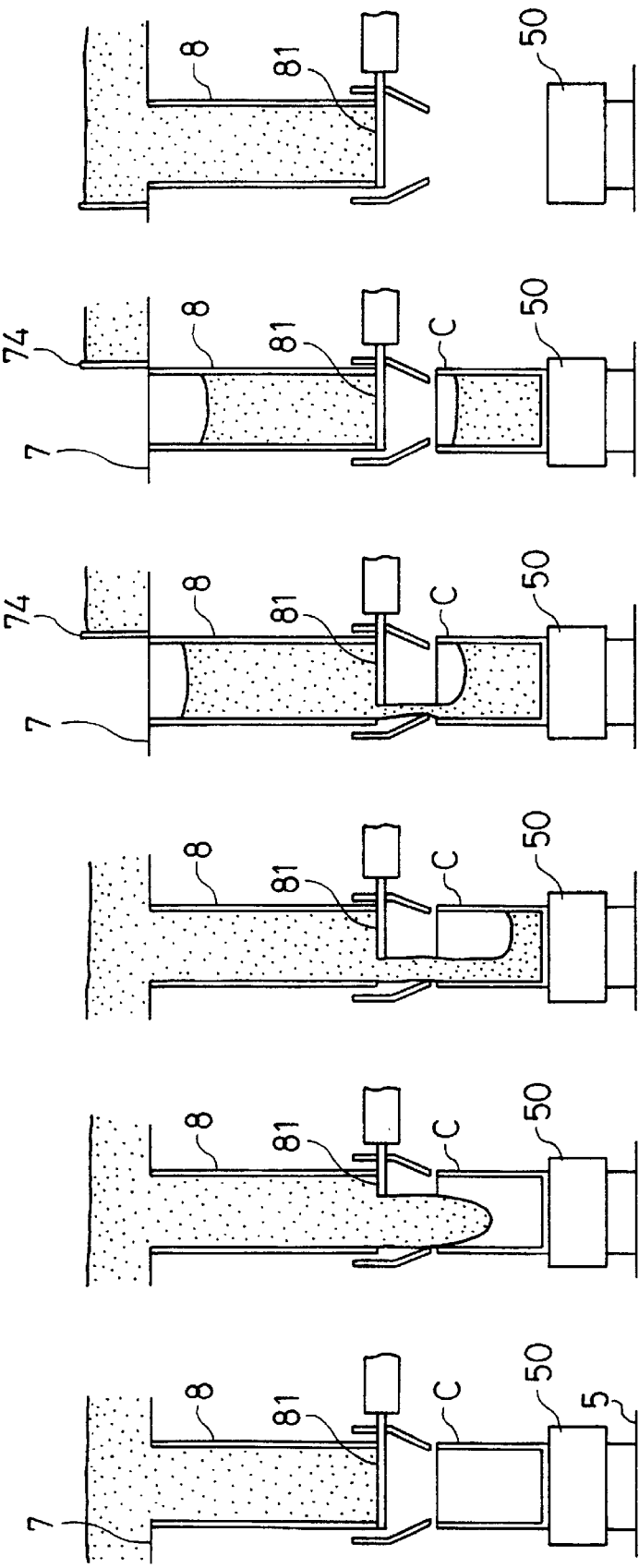
FIGS. 6(a) to 6(f) are diagrams showing steps of the filling method for filling bulk material to a container with the filling apparatus according to the first embodiment.

After the specified additional throw-in of bulk material is completed, the container C is introduced to the distilling conveyor 102 by the disfilling star wheel 53 and further transported to a successive process for a packaging process or the like (see FIGS. 5 and 6(f)).

As evident from the above description, use of the bulk material filling apparatus 1 according to this embodiment and the filling method for filling bulk material to a container using this apparatus enables a high precision filling to be conducted continuously in a short time.

Further, the bulk material filling apparatus 1 opens and closes the shutter 81 by means of the electric piston cylinder mechanism 60 and the massive throw-in and the additional throw-in are conducted by the shutter 81. Thus, as compared to a conventional damper type opening/closing operation, the present invention can achieve a more accurate opening/closing operation and can simplify the construction of the measure more than in related art.

Meanwhile, the filling apparatus for filling bulk material to a container according to the present invention is not restricted to the above described embodiment.

For example, it is permissible to use a so-called line type intermittent feeding apparatus in which the respective steps in the rotary type bulk material continuous filling apparatus 1 are distributed linearly instead of the former. In this case as well, it is needless to say that the same operation and effect as in the above case can be obtained.

The shape of the measure is not restricted to the cylindrical shape as described in the above embodiment but may be an elliptic cylinder, a rectangular cylinder, a triangular cylinder or the like.

Further, the shutter 81 is not restricted to any particular type as long as it has a function of throwing in bulk material into a container C mounted therebelow and may be a both-side withdrawal type, a three-way withdrawal type or the like, as long as the throw-in amount thereof can be controlled by the amount of its stroke.

Further, it is needless to say that the filling method for filling bulk material to a container according to the present invention is not restricted to an execution of the aforementioned embodiment by the bulk material filling apparatus 1.

Second Embodiment

In a rotary type filling apparatus 110 as shown in FIG. 7, a plurality of the containers C as an object to be filled are installed on a disc (second base 112). While this disc is rotated, bulk material such as powder is gradually filled into respective containers C. This rotary type filling apparatus 110 comprises a turn table 113 acting as a storage portion, filling hoppers 114, first base 111, second base 112, shutters 115 acting as an opening/closing device, an encoder 116 for detecting a travel distance of load cells 117 for detecting weights, and a control unit 118.

The turn table 113, the first base 111 and the second base 112 are fixed to a rotating shaft 119. The rotating shaft 119 is communicated with a driving motor 120 through a first bevel gear 121 and a second bevel gear 122 which mesh with each other. Thus, the turn table 113, the first base 111 and the second base 112 are rotated synchronously by means of the driving motor 120. The turn table 113, the first base 111, the second base 112, the rotating shaft 119, the driving motor 120 and the like are constructed so as to be surrounded by a casing 123.

The turn table 113 is capable of storing powder and has a plurality of the filling hoppers 114 disposed along the circumference thereof. The casing 123 has a powder supplying cylinder 124, from which powder is supplied into the turn table 113 and stored thereon. A plate 125 for suppressing flying of bulk material is provided under the powder supplying cylinder 124 to suppress flying of bulk material when supplying.

Figure 8:
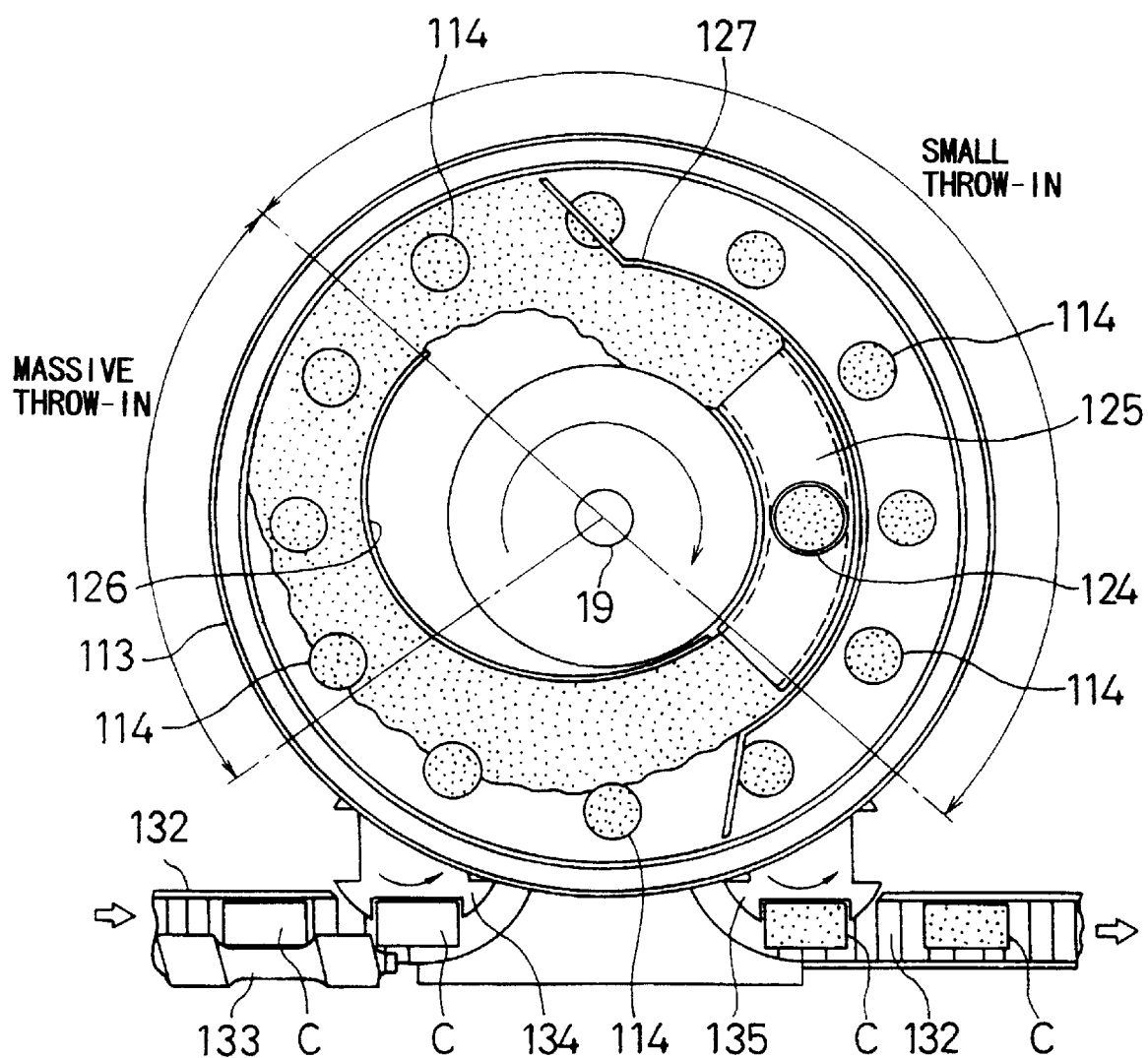
FIG. 8 is a sectional view taken along the line VII—VII of FIG. 7.

As the turn table 113 rotates, powder supplied from the powder supplying cylinder 124 thereto and stored thereon is forced outward in the diameter direction of the turn table 113 by the action of a force-out guiding plate 126 as shown in FIG. 8 and filled into the filling hoppers 114. Further, the action of a scratching plate 127 prevents a supply thereof to the filling hoppers 114.

While powder is supplied to the filling hoppers 114 by the force-out guiding plate 126, filling of bulk material at the first stage which will be described later is conducted. While forcing powder outward by the force-out guiding plate 126 is conducted and then it is scratched by the scratching plate 127, filling thereof at the second stage which will be described later is conducted.

Figure 10:
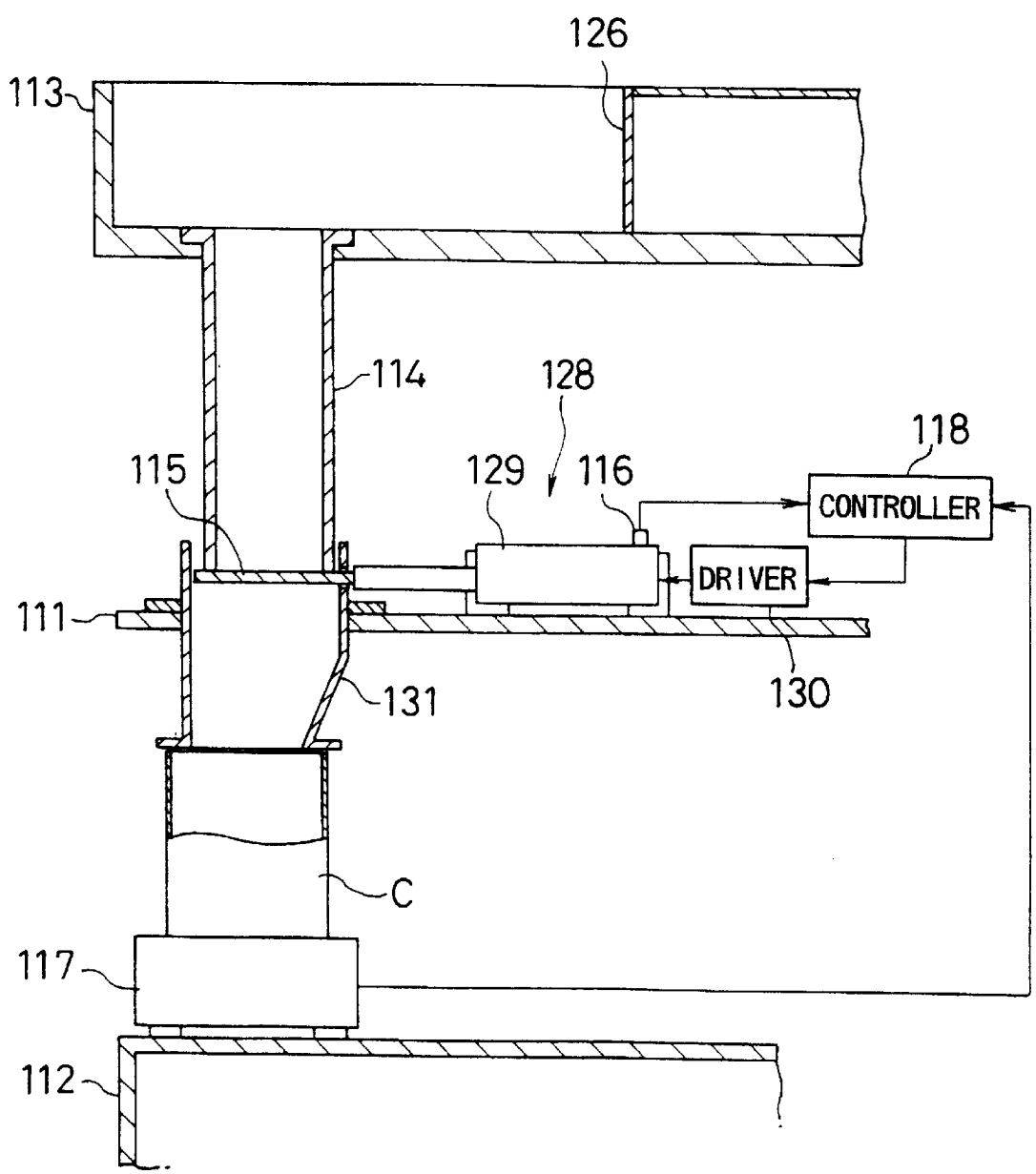
FIG. 10 is a sectional view showing an enlarged part of FIG. 7.

As shown in FIG. 7, a plurality of the filling hoppers 114 are disposed such that the outlet openings thereof can be opened and closed individually by a plurality of the shutters 115. As shown in FIG. 10, shutter activating devices 128 for activating the shutters 115 are disposed on the first base 111. The shutter activating device 128 comprises an electric cylinder 129 driven by a servo motor and a motor driver 130. The motor driver 130 is activated by a command from the control unit 118 to drive the electric cylinder 129 thereby determining the opening degree of the shutter 115. By changing an opening degree determined by the shutter activating device 128, the shutter 115 is capable of continuously adjusting the supply amount (filling weight) of powder to be filled into the container C from the filling hopper 114. The electric-driven cylinder 129 is equipped with the encoder 116 for detecting a travel distance X for the opening/closing operation of the shutter 115 and this detected value X is output to a control unit 118.

The second base 112 has a plurality of the load cells 117 disposed at respective positions corresponding to each of the filling hoppers 114 and the shutters 115. The containers C are placed on the load cells 117. The filling weight W of powder to be filled into the container C is detected by the load cell 117 and such a detected value W is output to the control unit 118.

Meanwhile, the first base 111 has powder flying preventive plates 131 which surround the outlet of each of the filling hoppers 114 and each of the shutters 115 so as to prevent powder from flying and scattering when powder is thrown into the container C from the filling hopper 114 thereby enhancing sealing performance between the filling hopper 114 and the container C.

As shown in FIG. 8, the container C is mounted on a transportation conveyor 132 and transported thereby and the transportation pitch of the container C is adjusted by a pitch adjusting device 133. Then the container C is carried onto the load cell 117 of the second base 112 by means of a supplying side star wheel 134. After the container C is filled with powder, it is sent out from the load cell 117 of the second base 112 to the transportation conveyor 132 by means of the disfilling side star wheel 135.

Figure 11:
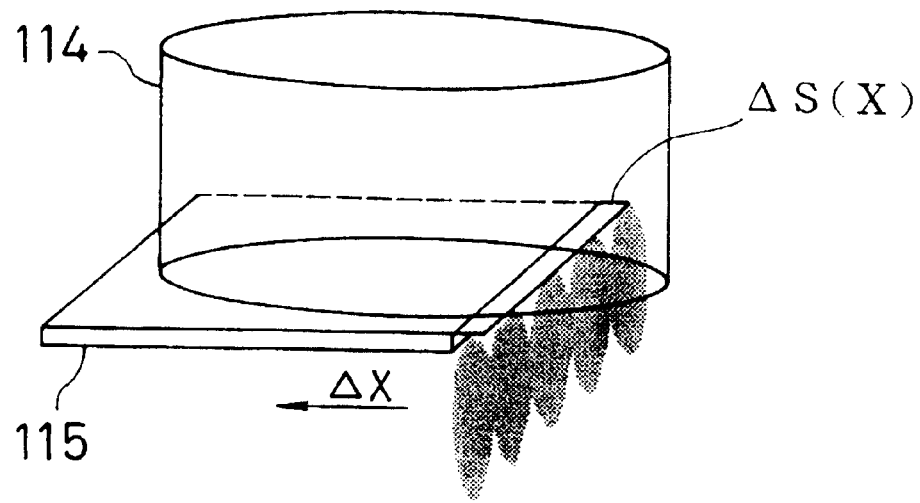
FIG. 11 is a perspective view showing schematically a filling hopper and a shutter shown in FIG. 10.
Figure 12:
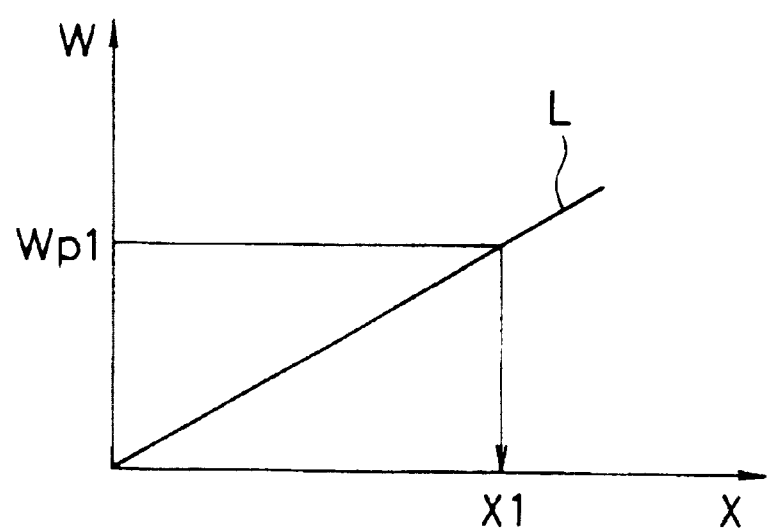
FIG. 12 is a graph showing a relationship between the weight of bulk material for use at the first stage filling and the opening degree of the shutter.

The control unit 118 controls the opening/closing operation of a shutter 115 through a shutter operating mechanism 128, determines the degree of the opening of the shutter 115 at real time and fills powder to a container C from a filling hopper 114. A travel distance X of the shutter 115 at an arbitrary time is input to the control unit 118 from the encoder 116 and further a powder filling weight W to the container C at an arbitrary time is input thereto from the load cell 117. This control unit 118 contains an objective filling amount Wp of powder to be filled into a single container, a predetermined ratio α of the first stage objective filling amount $Wp_1$ (described later) relative to this Wp, a linear approximation data L as shown in FIG. 12 indicating a relationship between the travel distance X of the shutter 115 and the filling weight W of powder to be filled into the container C, and an inverse function F(S) determined by the shape of the outlet shape of the filling hopper 114. This inverse function F(S) is fixed as follows, because as shown in FIG. 11, the change rate AS of the outlet opening area S of the filling hopper 114 in the interval of a minute time is determined as a function of the change rate AX of the travel distance X of the shutter 115 in this while:

$$F(S)=X/S \tag{1}$$

Here, a measuring method for the fluidity Uρ of powder will be described. In FIG. 11, assuming that the change rate of the travel distance of the shutter 115 in the interval of a minute time Δt is ΔX, the change rate of the outlet opening area of the filling hopper 114 is ΔS, the drop velocity of powder is U, and the specific gravity of powder is ρ, the change rate ΔQ of the filling weight of powder to be filled by powder dropping to the container C in this minute interval of time Δt is determined as follows:

$$\Delta Q = \Delta S(X) \times U \times \Delta t \times \rho \quad (2)$$

The $\Delta Q$ can be obtained from the filling weight W of powder measured by the load cell 117, the $\Delta S(X)$ can be obtained from the travel distance X of the shutter 115 measured by the encoder 116 and the $\Delta t$ has been preliminarily determined as a sampling interval. Thus, the fluidity $U\rho$ of powder in this minute interval of time $\Delta t$ can be measured according to the following expression (3).

$$U\rho = \Delta Q / (\Delta S(X) \times \Delta t) \quad (3)$$

If the $\Delta S(X)$ is eliminated using the above expressions (1), (2), the following expression can be obtained.

$$X = \{\Delta Q / U\rho \times \Delta t\} \times F(S) \quad (4)$$

As a result, the travel distance X of the shutter 115 can be obtained.

The fluidity $U\rho$ of powder varies depending on the size of the particles of bulk material, percentage of voids of the powder particles, the shape of the powder particles, specific gravity of the powder, temperature and humidity in the filling hopper 114, the powder flying preventive plate 131 and the container C, and friction of the walls of the filling hopper 114, the powder flying preventive plate 131, and the container C, and the flow condition of air in the filling hopper 114, the powder flying preventive plate 131 and the container C and the like. This fluidity $U\rho$ of powder affects the accuracy in weight of powder to be filled when the powder is thrown into the container C from the filling hopper 114.

Figure 13:
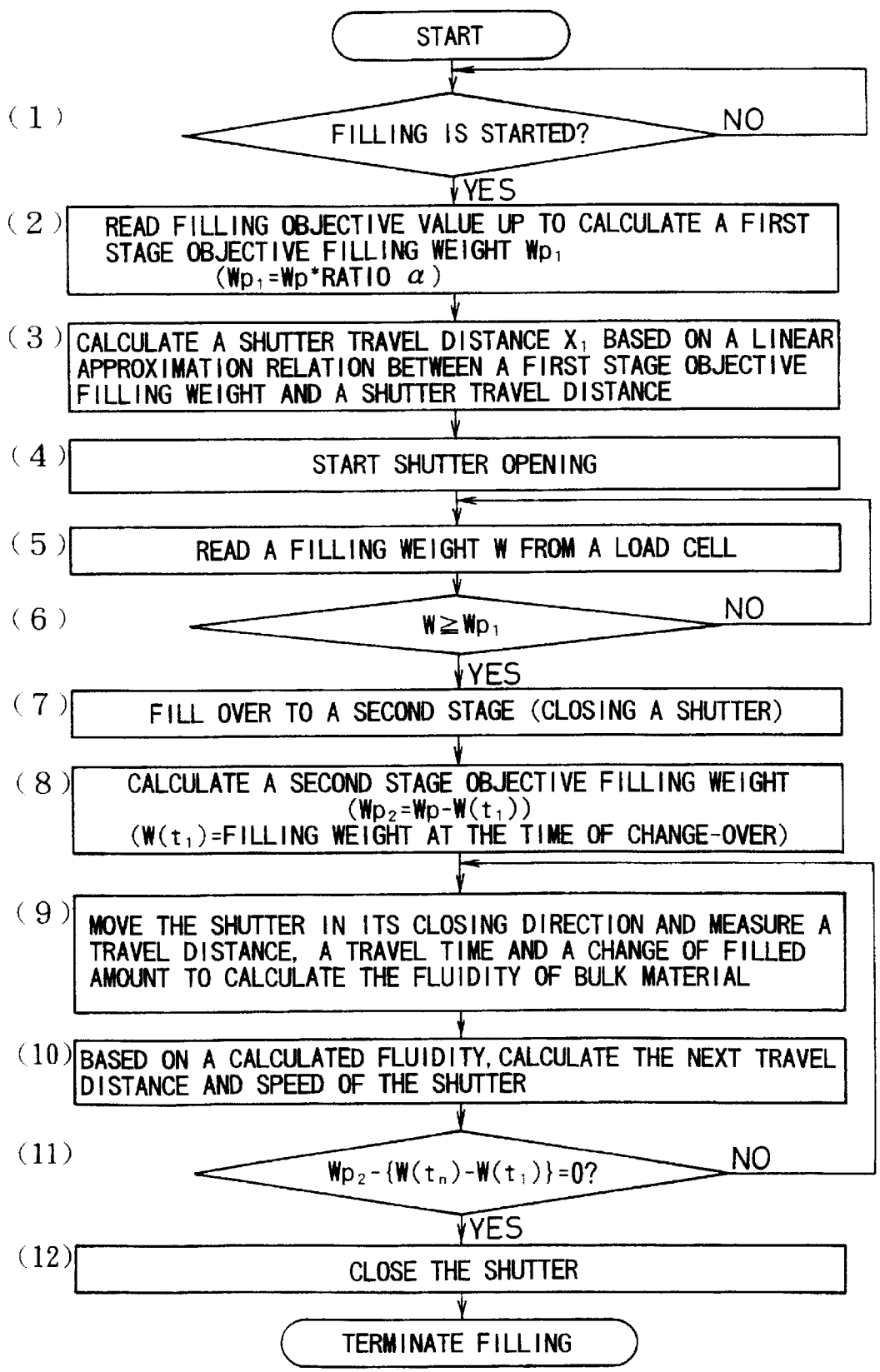
FIG. 13 is a flow chart of filling control for bulk material.

Meanwhile, the control unit 118 executes filling of the first and second stages when filling of powder from the filling hopper 114 into the container C is started (step (1) in FIG. 13).

At the first stage filling, the control unit 118 calculates a first stage objective filling weight $Wp_1$ from an objective filling weight Wp and the predetermined ratio $\alpha$ according to the expression (5) below (step (2)).

$$Wp_1 = Wp \times \alpha \quad (5)$$

Here, the predetermined ratio a is, for example, 98%. Next, the control unit 118 calculates a travel distance (specified opening degree) $X_1$ of the shutter 115 corresponding to the first stage objective filling weight $Wp_1$ from the linear approximation data L shown in FIG. 12 (step (3)) and moves the shutter 115 at a specified speed (for example, $X_1/1$ m/sec) up to a travel distance $X_1$ (step (4)) to fill powder at a massive flow rate into the container C. In this while, the load cell 117 measures the filling weight W in the interval of the minute time $\Delta t$ (e.g. 10 mmsec) as shown in FIG. 14(A) and this measured value W is entered into the control unit 118 (step (5)).

At the first stage filling, when the measured value of the filling weight W in the container C which is to be measured by the load cell 117 exceeds the first stage objective filling weight $Wp_1$, the control unit 118 closes the shutter 115 from the specified opening degree $X_1$ so as to change over from the first stage filling to the second stage filling (step (6), (7)). This change-over time is first stage filling completion time and further second stage filling start up time. This change-over time is assumed to be $t_1$.

Because the measured value $W(t_1)$ by the load cell 117 at this change-over time $t_1$ is $W(t_1)$, the control unit 118 calculates the second stage objective filling weight $Wp_2$ according to the expression below (6) (step (8)).

$$Wp_2 = Wp - W(t_1) \quad (6)$$

Further, the control unit 118 sets the travel distance X ($t_2$) for the closing operation of the shutter 115 in order to move the shutter 115 from this time $t_1$ to next time $t_2$ which is ahead by the minute time $\Delta t$ and the travel speed V($t_2$) of the shutter 115 as follows:

X ($t_2$)=initial travel distance a (a=1 mm)

V ($t_2$)=a/$\Delta t$

Meanwhile, the reason why the measured value of the load cell 117 drops at time $t_1$ as shown in FIGS. 14(a) and 14(b) is due to an influence of the acceleration applied to powder at the first stage filling and that the measured value of the load cell 117 indicates a higher value than an actual filling weight.

At the time $t_2$ of the second stage filling, based on the travel distances $X(t_1)$, $X(t_2)$ of the shutter 115 at the respective times $t_1$, $t_2$ measured by the encoder 116, the control unit 118 calculates a change rate of the outlet opening area of the filling hopper 114 in this while as follows:

$$\Delta S(X(t_2) - X(t_2))$$

Further, based on the filling weights $W(t_1)$, $W(t_2)$ detected by the load cell 117 at the respective times $t_1$, $t_2$, the control unit 118 calculates a change rate $\Delta Q(t_2)$ of the filling weight of powder in this while as follows:

$$\Delta Q(t_2) = W(t_2) - W(t_1)$$

Thus, the control unit 118 calculates the fluidity $U\rho$ ($t_2$) of powder in an interval from time $t_1$ to time $t_2$ using these values according to the expression (3), as follows:

$$U\rho(t_2) = \Delta Q(t_2) / \{\Delta S(X(t_2) - X(t_1)) \times \Delta t\} \text{(step (9))}$$

At time $t_2$, the control unit 118 calculates the closing travel distance $X(t_3)$ and travel speed $V(t_3)$ of the shutter 115 to be moved in an interval of minute time $\Delta t$ up to next time $t_3$, based on the fluidity $U\rho$ ($t_2$) according to the expression (4) as follows:

$$X(t_3) = [\{Wp_2 - (W(t_2) - W(t_1))\} / U\rho(t_2) \times \Delta t] \times F(s)$$

$$V(t_3) = X(t_3) / \Delta t \text{ (step (10))}$$

Likewise, at the second stage filling time $t_3$, the control unit 118 calculates a change rate of the outlet opening area of the filling hopper 114 in an interval of minute time $\Delta t$ from time $t_2$ to time $t_3$, according to;

$$\Delta S(X(t_3) - X(t_2))$$

and a change rate of the filling weight of the powder in this while according to;

$$\Delta Q(t_3) = W(t_3) - W(t_2)$$

Then, the control unit 118 calculates the fluidity $U\rho(t_3)$ of this powder in an interval of minute time $\Delta t$ from time $t_2$ to time $t_3$ according to the following expression;

$$U\rho(t_3)=\Delta Q(t_3)/\{\Delta S(X(t_3)-X(t_2))\times\Delta t\}$$

Based on this fluidity $U\rho(t_3)$ of the powder, the control unit 118 calculates the closing travel distance $X(t_4)$ and travel speed $V(t_4)$ of the shutter 115 to be moved in an interval of minute time from $\Delta t$ time $t_3$ to next time $t_4$, using the expression (4) according to the following expression.

$$X(t_4)=[\{Wp_2-(W(t_3)-W(t_1))\}/U\rho(t_3)\times\Delta t]\times F(S)$$

$$V(t_4)=X(t_4)/\Delta t$$

The control unit 118 conducts arithmetic operation up to time $t_n$ in the same manner and at time tn, calculates a change rate $\Delta(S(X(t_n)-X(t_{n-1}))$ of the outlet opening area of the filling hopper 114 in an interval from time $t_{n-1}$ to time $t_n$ and a change rate $\Delta Q(t_n)=W(t_n)-W(t_{n-1})$ of the filling weight of the powder in this while, and further calculates and measures the fluidity $U\rho(t_n)$ of powder in an interval of minute time $\Delta t$ from that time $t_{n-1}$ to time $t_n$, according to $U\rho(t_n)=\Delta Q(t_n)/\{S(X(t_n)-X(t_{n-1}))\times\Delta t\}$. Based on the fluidity $U\rho(t_n)$ of this bulk material 2, the control unit 118 calculates the closing travel distance $X(t_{n+1})$ and travel speed $V(t_{n+1})$ of the shutter 115 to be moved in an interval of minute time $\Delta t$ from time $t_n$ to next time $t_{n+1}$ using the expression (4) according to the following expression;

$$X(t_{n+1})=[\{Wp_2-(W(t_n)-W(t_1))\}/U\rho(t_n)\times\Delta t]\times F(S)$$

$$V(t_{n+1})=X(t_{n+1})/t$$

The control unit 118 repeats the above described second stage filling operation until the filling weight applied from the second stage filling start up time $t_1$ to an arbitrary time $t_n$ coincides with $Wp_2$, that is, until as shown in FIG. 14(b), the filling weight applied up to an arbitrary time $t_n$ coincides with an objective filling weight Wp, in other words, until $Wp_2-(W(t_2)-W(t_1))=Wp-W(t_n)\rightarrow 0$ (step (11)). If the above coincidence is attained, the shutter 115 is made to close fully such that the filling of powder is terminated (step (12)).

Figure 9:
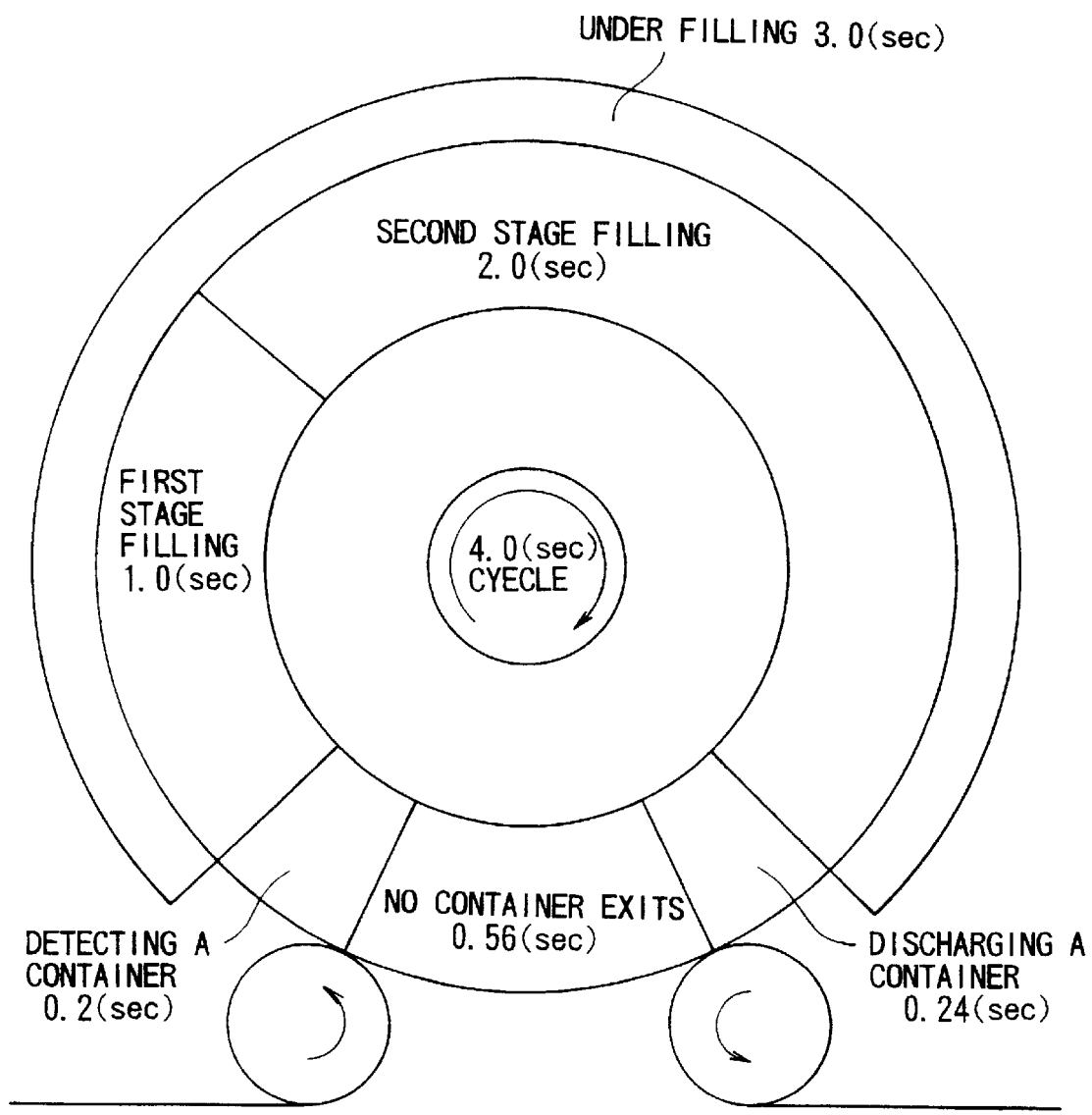
FIG. 9 is a fill timing chart in the rotary type filling apparatus shown in FIG. 7.

In the rotary type filling apparatus 110 having the construction described above, for example as shown in FIG. 9, the turn table 113 and the first base 111 and the second base 112 make a single turn in 4 seconds and the weight of the container C carried to the load cell 117 of the second base 112 from the supplying side star wheel 134 is detected by the load cell 117 in the first 0.2 seconds. In the next 0.1 seconds, filling at the first stage from the filling hopper 114 to the container C is conducted such that rapid filling at a massive filling rate is achieved. In the next 0.2 seconds, filling at the second stage from the filling hopper 114 to the container C is conducted such that a high precision filling at a minute filling rate is achieved. Then, the container C in which powder is fully filled is carried out to the transportation conveyor 132 by means of the disfilling side star wheel 135 in 0.24 seconds and in the next 0.56 seconds, no container C is placed on the load cell 117.

According to the above described embodiment, because the shutter 115 is opened up to a specified opening degree $X_1$ at the first stage filling such that the powder can be massively filled into the container C up to its first stage objective filling weight $Wp_1$, the powder can be filled rapidly.

Further, at the second stage filling, the shutter 115 is activated so as to be closed from its specified opening degree $X_1$. According to the change rate $\Delta S$ of the outlet opening area of the filling hopper 114 and the change rate $\Delta Q$ of the filling weight W of powder, based on the closing travel distance X of the shutter 115 in an interval of a certain minute time $\Delta t$, the fluidity $U\rho$ of bulk material in the interval of that minute time $\Delta t$ is calculated at real time. Then, based on this fluidity $U\rho$, the closing travel distance X and the closing travel speed V of the shutter 115 in a next interval of minute time $\Delta t$ are calculated and the shutter 115 is closed such that the filling is completed. As described above, because the fluidity $U\rho$ of powder is calculated and measured at real time while it is being filled and based on this fluidity $U\rho$, the opening degree of the shutter 115 is controlled so as to determine the full closing timing of the shutter 115. Thus, it is possible to reduce the amount of powder existing between the shutter 115 and the container C to a minimum extent particularly when the shutter 115 is operated so as to be closed fully, so that a high precision filling can be achieved.

Although a case of powder is described as bulk material in the above described embodiment, the same operation can be attained in a case of grain. Further, although a case of the rotary type filling apparatus is described in this embodiment, it is possible to apply the present invention to the other filling apparatus.

Third Embodiment

Figure 15:
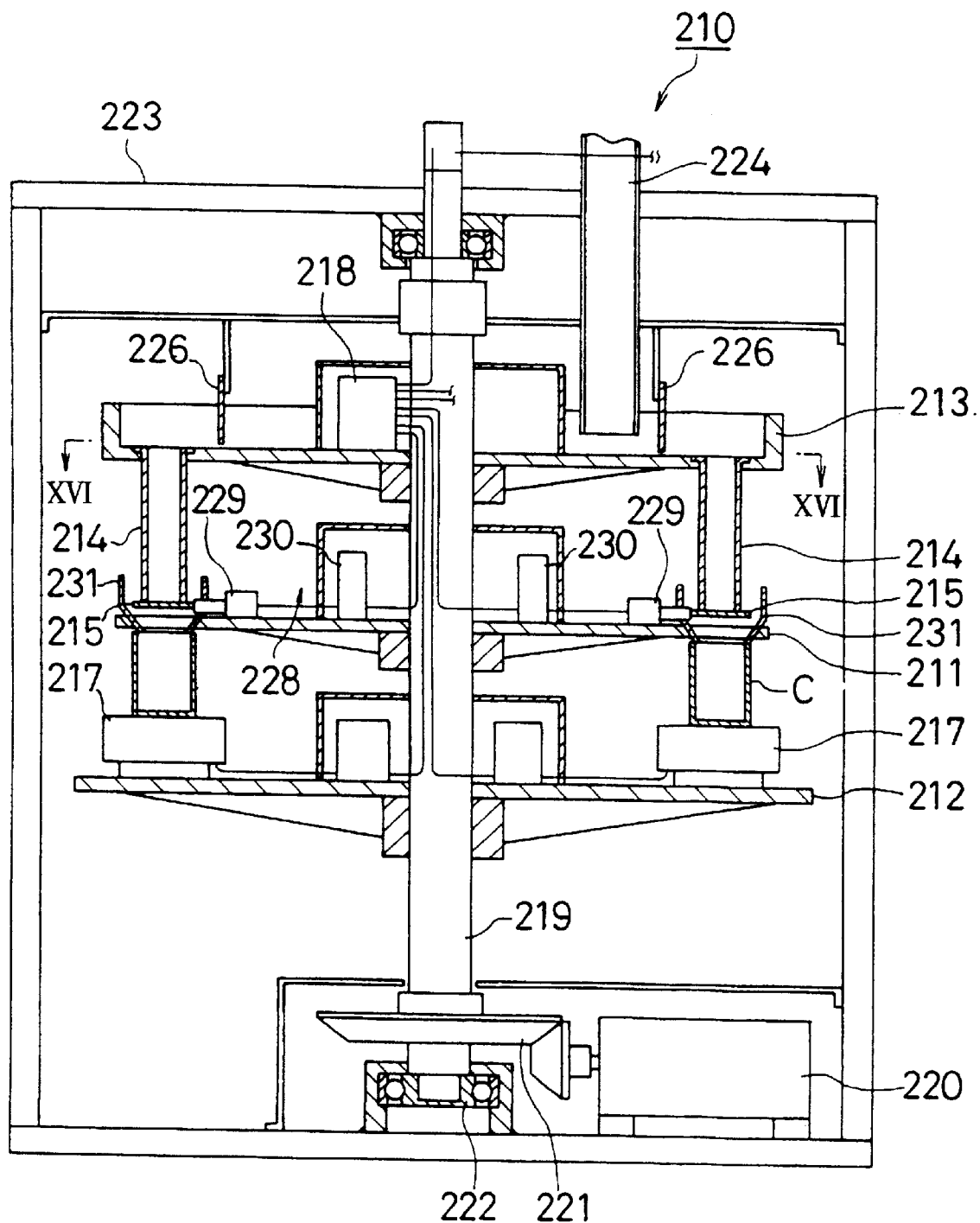
FIG. 15 is a schematic view showing the third embodiment of the filling apparatus.

In a rotary type filling apparatus 210 as shown in FIG. 15, a plurality of the containers C as an object to be filled are installed on a disc (second base 212). While this disc is rotated, bulk material such as powder is gradually filled into respective containers C. This rotary type filling apparatus 210 comprises a turn table 213 acting as a storage portion, filling hoppers 214, a first base 211, the second base 212, shutters 215 acting as an opening/closing device, load cells 217 for detecting weights, and a control unit 218.

The turn table 213, the first base 211 and the second base 212 are fixed to a rotating shaft 219. This rotating shaft 219 is communicated with a driving motor 220 through a first bevel gear 221 and a second bevel gear 222 which mesh with each other. Thus, the turn table 213, the first base 211 and the second base 212 are rotated synchronously by means of the driving motor 220. The turn table 213, the first base 211, the second base 212, the rotating shaft 219, the driving motor 220 and the like are constructed so as to be surrounded by a casing 223.

The turn table 213 is capable of storing powder and has a plurality of the filling hoppers 214 disposed along the circumference thereof. The casing 223 has a powder supplying cylinder 224, from which powder is supplied into the turn table 213 and stored thereon.

Figure 16:
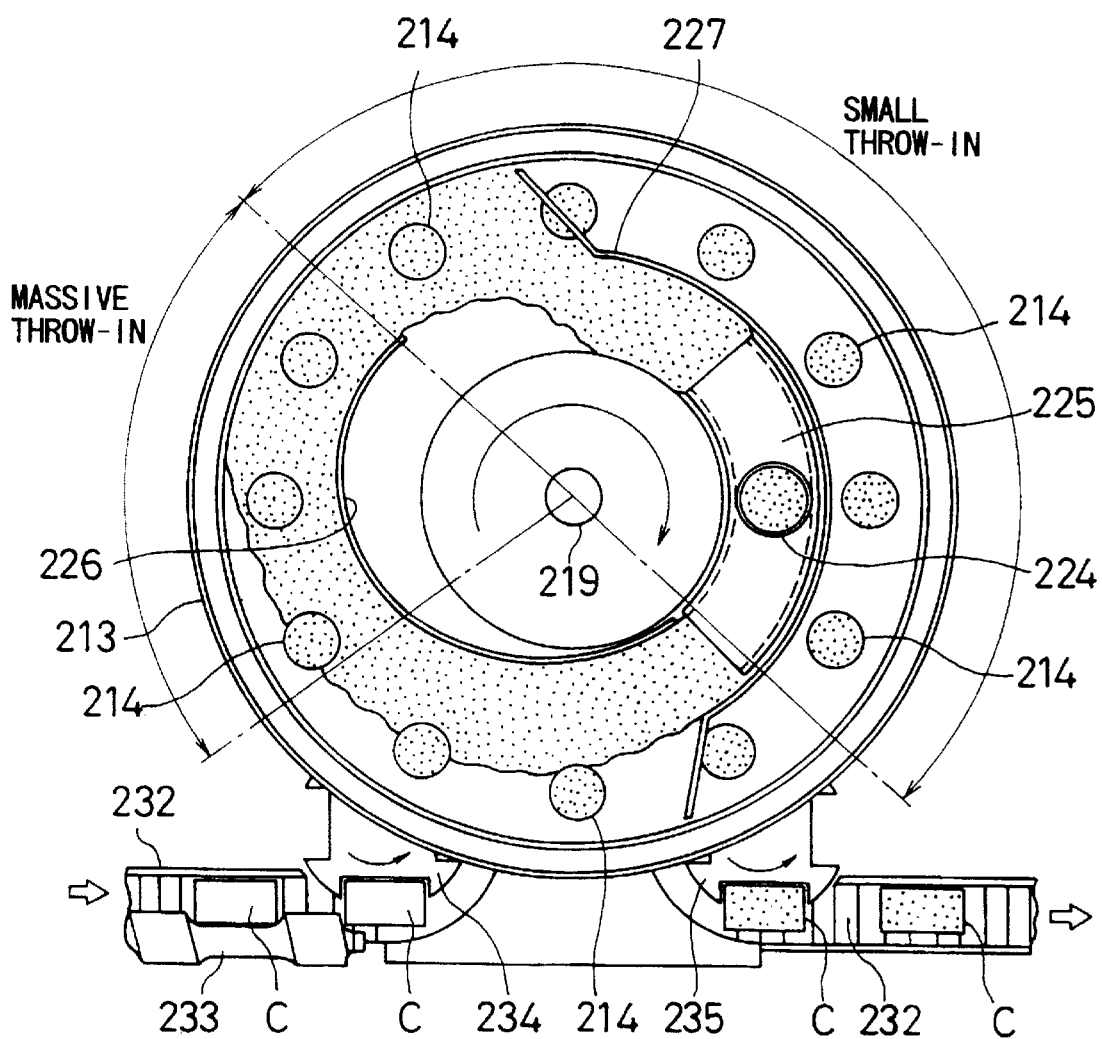
FIG. 16 is a sectional view taken along the line XVI—XVI of FIG. 15.

As the turn table 213 rotates, powder supplied from the powder supplying cylinder 224 thereto and stored thereon is forced outward in the diameter direction of the turn table 213 by the action of a force-out guiding plate 226 as shown in FIG. 16 and filled into the filling hoppers 214. Further, the action of a scratching plate 227 prevents a supply thereof to the filling hoppers 214.

While powder is supplied to the filling hoppers 214 by the force-out guiding plate 226, filling of bulk material at the massive throw-in stage which will be described later is conducted. While forcing powder outward by the force-out guiding plate 226 is conducted and then it is scratched by the scratching plate 227, filling thereof at the small throw-in stage which will be described later is conducted.

Figure 18:
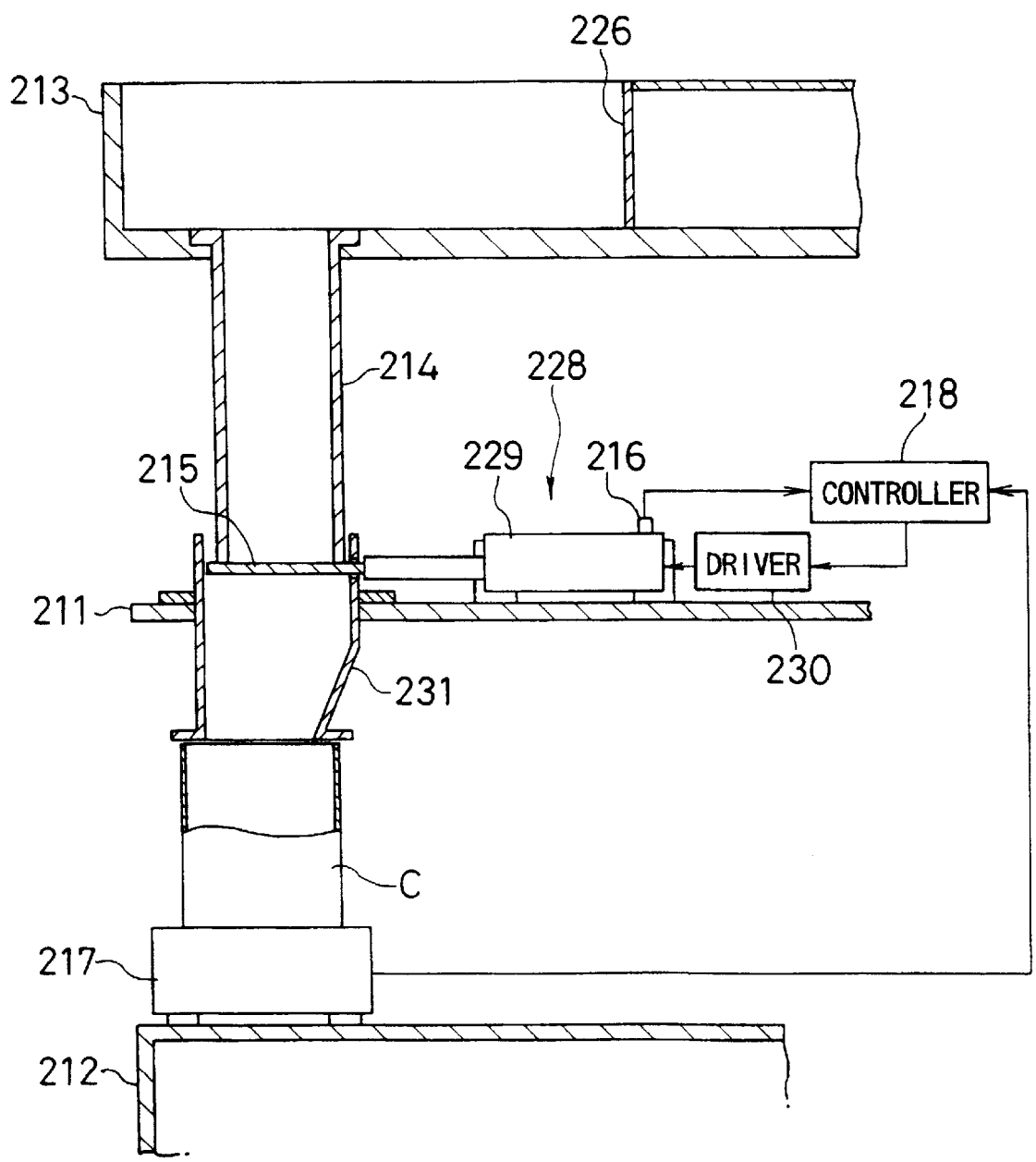
FIG. 18 is an enlarged view of the major section of FIG. 15.

As shown in FIG. 15, a plurality of the filling hoppers 214 are disposed such that the outlet openings thereof can be opened and closed individually by a plurality of the shutters 215. As shown in FIG. 18, shutter activating devices 228 for activating the shutters 215 are disposed on the first base 211. This shutter activating device 228 comprises an electric cylinder 229 driven by a servo motor and a motor driver 230. This motor driver 230 is activated by a command from the control unit 218 to drive the electric cylinder 229 thereby determining the opening degree of the shutter 215. By changing an opening degree determined by the shutter activating device 228, this shutter 215 is capable of adjusting continuously the supply amount (filling weight) of powder to be filled into the container C from the filling hopper 214. That is, the control unit 218 controls so as to supply a specified initial filling amount of powder massively with the shutter 215 opened at a massive opening degree at the massive throw-in stage, and then supply a remaining filling amount thereof at a small flow rate at the small throw-in stage thereby completing a filling of an objective filling weight ($W_0$) of powder in the container C.

The second base 212 has a plurality of the load cells 217 disposed at respective positions corresponding to each of the filling hoppers 214 and the shutters 215. The containers C are placed on the load cells 217. The filling weight W of powder to be filled into the container C is detected by the load cell 217 and such a detected value W is output to the control unit 218.

Meanwhile, the first base 211 has powder flying preventive plates 231 which surround the outlet of each of the filling hoppers 214 and each of the shutters 215 so as to prevent powder from flying and scattering when powder is thrown into the container C from the filling hopper 214 thereby enhancing the sealing performance between the filling hopper 214 and the container C.

As shown in FIG. 16, the container C is mounted on a transportation conveyor 232 and transported thereby and the transportation pitch of the container C is adjusted by a pitch adjusting device 233. Then the container C is carried onto the load cell 217 of the second base 212 by means of a supplying side star wheel 234. After the container C is filled with powder, it is sent out from the load cell 217 of the second base 212 to the transportation conveyor 232 by means of the disfilling side star wheel 235.

Figure 19:
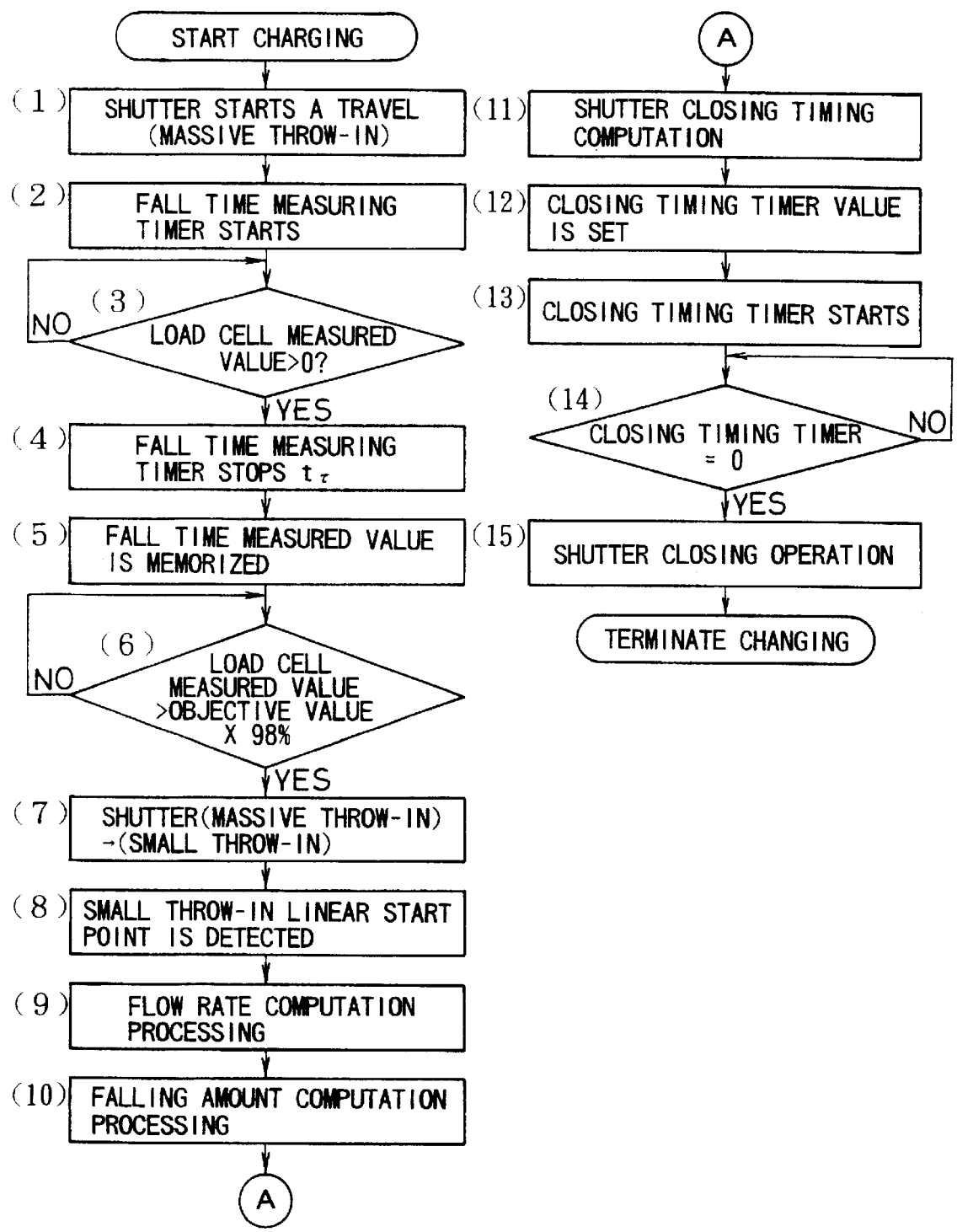
FIG. 19 is a flow chart of filling control.

The filling amount control operation by the control unit 218 is conducted as follow (see FIG. 19).

Figure 20:
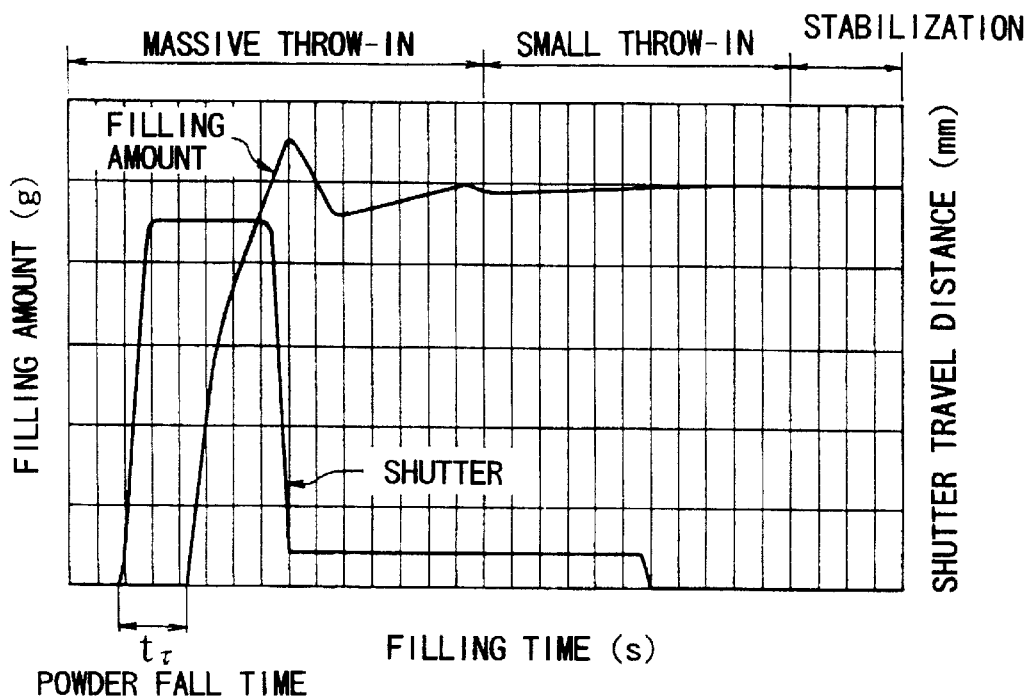
FIG. 20 is a linear diagram showing a filling time curve.

(A) Massive throw-in stage (FIG. 20)

The initial filling weight at the massive throw-in stage is assumed to be a (e.g. 98%) relative to the objective filling weight ($W_0$).

(1) The shutter 215 is opened by the shutter activating device 228. Then, the shutter 215 is kept at a specified large opening degree (step (1)).

(2) A fall time measuring timer is started at a shutter 215 opening start timing (step (2)). When the load cell 217 detects a weight of powder (step (3)), the fall time measuring timer is stopped and a fall time (tτ) of powder which falls from the outlet opening of the filling hopper 214 into the container C is output (step (4)). This fall time (tτ) is memorized in a memory (step (5)).

Meanwhile, the control unit 218 utilizes the average value of the fall times measured at a filling operation of just nearby N cycle and memorized in the memory as the fall time described above for use in calculation of a falling amount which will be described later.

(3) If such a detected value by the load cell 217 reaches the initial filling weight ($W_0 \times \alpha$) at the massive throw-in stage, the opening degree of the shutter 215 is adjusted to a specified small opening degree by the shutter activating device 228. (steps (6), (7))

The reason why after the opening degree of the shutter 215 is changed to its small opening degree, the value detected by the load cell 217 drops with respect to its peak value as shown in FIG. 20 is that the fall acceleration of powder is applied to the load cell 217 when it strikes the load cell 217 such that the value measured by the load cell 217 exceeds the actual weight of powder already filled in the container C.

Figure 21:
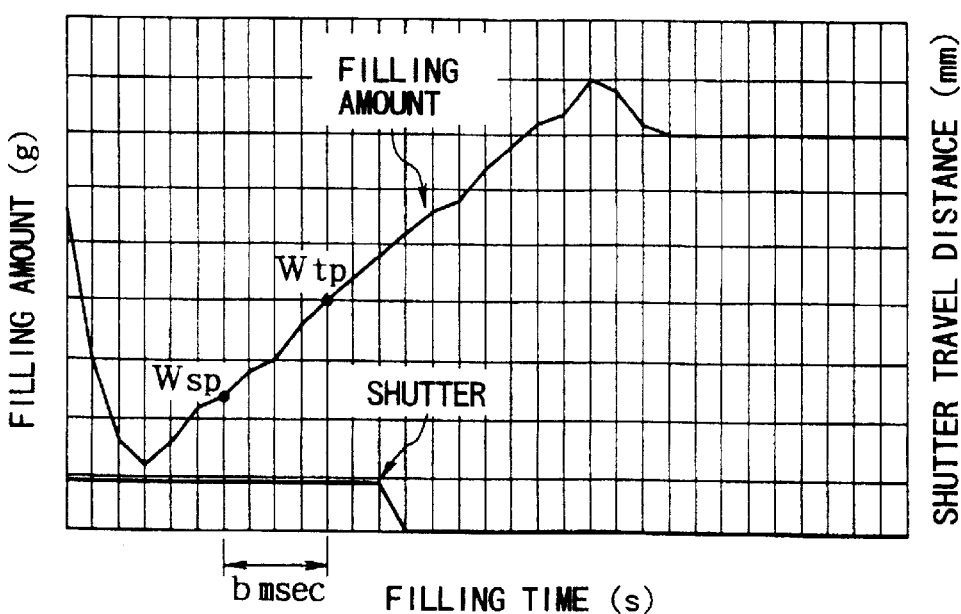
FIG. 21 is a linear diagram showing the major section of FIG. 20 in detail.
Figure 22:
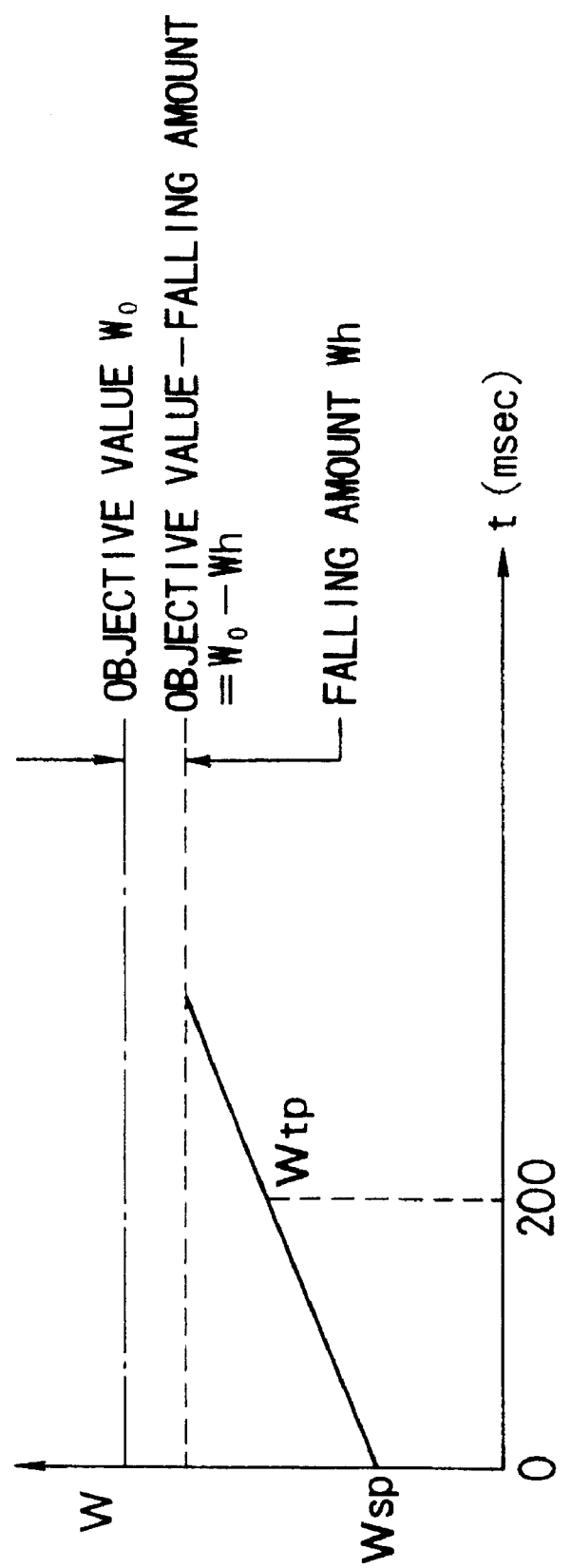
FIG. 22 is a linear diagram showing a flow rate calculation method.

(B) Small throw-in stage (FIGS. 20, 21)

(1) After the opening degree of the shutter 215 is changed to its small opening degree, the detected values $W(T_{n+1})$, $W(T_n)$ of the load cell 217 at the filling times $T_{n+1}$, $T_n$ indicate a following relationship due to the action of the application of the fall acceleration of the powder described above, $$W(T_{n+1}) - T_n < 0 \tag{1}$$

and it is recognized that the detected value of the load cell 217 exceeds its peak value as described above.

Then, after the above relationship (1) is attained, it is recognized that the massive throw-in stage has been changed to the small throw-in stage with;

$$W(T_{n+1}) - T_n > |A| \tag{2}$$

Where, for example, A=10 g, sampling frequency is 10 msec.

Further, after the above expression (2) is established, the detected value of the load cell 217 for example when amsec (safety ratio time for confirming that the stable linear area has been attained) has passed is detected as Wsp in which the linear application at the small throw-in stage has been started. (step (8)).

(2) A flow rate q of powder made to flow from the filling hopper 214 is measured (step (9)). Based on Wsp, a detected value Wtp of the load cell 217 when bmsec has passed is obtained. (FRIG. 22) The flow rate q is determined as follows.

$$q = (Wtp - Wsp)/b \tag{3}$$

Thus, if a passed time since Wsp is reached is assumed to be t, the filling weight W to the container C is;

$$W = [((Wtp - Wsp)/b] \times t + Wsp \tag{4}$$

(3) The falling amount Wh existing in the air from just below the outlet opening of the filling hopper 214 closed by the shutter 215 to the container C is calculated from the previously mentioned fall time (tτ) and the flow rate (q) according to;

$$Wh = [(Wtp - Wsp)/b] \times t\tau \tag{5 (step (5))}$$

(4) The closing timing of the shutter 215 is calculated (step (11)). The timing in which the filling weight W filled to the container C at the small throw-in stage reaches $$W = W_0 - Wh \tag{6}$$

is assumed to be the closing timing of the shutter 215. If the above expression (6) is substituted for the expression (4), the closing timing t is;

$$t = (W_0 - Wh - Wsp) \times b/(Wtp - Wsp) \tag{7}$$

(5) Based on the closing timing t calculated in (4) above, the closing timing timer value is set (step (12)). Then, the closing timing timer is started (step (13)) and when the measured value of the closing timing timer reaches its set value (step (14)), the shutter 15 is closed (step (15)) and then the filling operation is completed.

Figure 17:
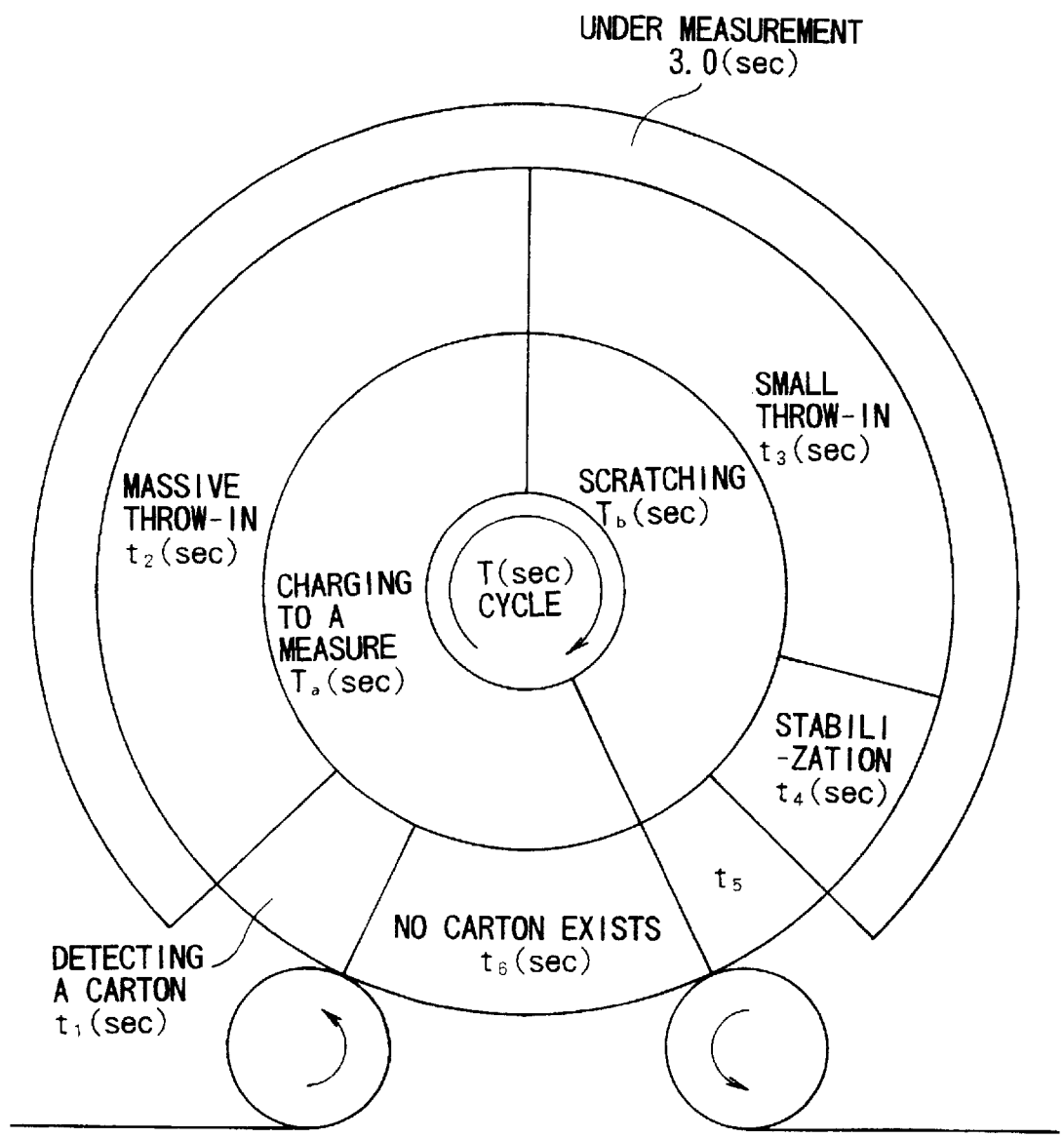
FIG. 17 is a fill timing chart of the filling apparatus.

In the rotary type filling apparatus 210 having the construction described above, for example as shown in FIG. 17, the turn table 213 and the first base 11 and the second base 212 make a single turn in T seconds and the weight of the container C carried to the load cell 217 of the second base 212 from the supplying side star wheel 234 is detected by the load cell 217 in first $t_1$ seconds. In the next $t_2$ seconds, filling at the massive throw-in stage from the filling hopper 214 to the container C is conducted such that rapid filling at a massive filling rate is achieved. In the next $t_3$ seconds, filling at the small throw-in stage from the filling hopper 214 to the container C is conducted such that a high precision filling at a minute filling rate is achieved. After a stable interval of $t_4$ (allowance time), the container C in which powder is fully filled is carried out to the transportation conveyor 232 by means of the distilling side star wheel 235 in t5 seconds and in the next t6 seconds, no container C is placed on the load cell 217.

Thus, the following operations (1)–(3) are attained according to the present embodiment.

(1) Because the shutter 215 is opened at a specified opening degree at the massive filling stage and powder can be massively filled to the container C up to the initial filling weight, rapid filling of powder can be done.

(2) At the small filling stage, the amount of powder (falling amount Wh) existing in the air (falling height) from just below the outlet opening of the filling hopper 214 closed by the shutter 215 to the container C is calculated and the shutter 215 is closed at the timing in which the filling weight (W) of powder fully filled in the container C reaches $W = W_0 - Wh$. While powder is being filled, the fall time tr and flow rate q of powder are measured at real time and based on such a measured value, the closing timing of the shutter 215 is determined. Thus, a high precision filling can be achieved without being affected by a change of the characteristics of powder and a necessity of container C type change-over time.

(3) By adopting the fall time tτ of powder for use in calculation of the falling amount Wh as an average of the fall time tτ measured in just nearby N cycle filling operation, the filling accuracy can be improved.

Although a case of powder is described as bulk material in the above described embodiment, the same operation can be attained in a case of grain. Further, although a case of the rotary type filling apparatus is described in this embodiment, it is possible to apply the present invention to other filling apparatuses.

INDUSTRIAL APPLICABILITY

As described above, according to the method and apparatus for filling bulk material, when bulk material such as detergent, bleaching agent, solvent, chemical and the like are filled into containers, such bulk material can be filled to a filling object rapidly and at a high precision.

Obvious numerous modifications and variations of the present invention are possible in light of the above teachings. It is therefore to be understood that within the scope of the appended claims, the invention may be practiced otherwise than as specifically described herein.

What is claimed is:

1. A method for filling bulk material, in which an objective filling weight for filling bulk material stored in a storage portion to a filling object is divided to a first stage objective filling weight and a second stage objective filling weight, the method comprising:

a first stage filling step which comprises setting an opening/closing mechanism provided on said storage portion to a predetermined opening degree and filling the bulk material from said storage portion to said filling object until said first stage objective filling weight is reached;

a second stage filling step which comprises activating said opening/closing mechanism so as to close from said predetermined opening degree, detecting a closing travel distance of said opening/closing mechanism in a certain minute time interval and a filling weight of bulk material, and based on said detected values, calculating a fluidity of the bulk material in such a minute time interval; and a step of calculating a closing travel distance and a closing travel speed of said opening/closing mechanism in a next minute time interval based on the fluidity so as to activate said opening/closing mechanism to close thereby filling the bulk material to said filling object until said objective filling weight is reached.

2. An apparatus for filling bulk material, the apparatus comprising:

a storage portion for storing bulk material;

an opening/closing mechanism disposed on said storage portion, for continuously adjusting a supply amount of the bulk material to be supplied from said storage portion to a filling object by an opening/closing action;

a travel distance detecting device for detecting an opening/closing travel distance of said opening/closing device;

a weight detecting device for detecting a filling weight of the bulk material to be filled into said filling object; and a control unit for controlling an opening/closing operation of said opening/closing mechanism;

said control unit controlling according to a first stage filling in which the opening/closing mechanism is set to a predetermined opening degree and the bulk material is filled from said storage portion to said filling object until a first stage objective filling weight is reached; and a second stage filling in which said opening/closing mechanism is activated so as to close from said predetermined opening degree, and a fluidity of the bulk material in such that a minute time interval is calculated from a closing travel distance of said opening/closing mechanism and a filling weight of the bulk material, which are detected by said travel distance detecting device and said weight detecting device in a certain minute time interval; and a closing travel distance and a closing travel speed of said opening/closing mechanism in a next minute time interval are calculated based on the fluidity so as to activate said opening/closing mechanism to close thereby filling the bulk material to said filling object until said objective filling weight is reached.

3. A method for filling bulk material for filling the bulk material stored in a storage portion to a filling object by means of controlling an opening/closing operation of an opening/closing device disposed in said storage portion and filling a specified initial filling amount at a massive throw-in stage, and then filling a remaining filling amount at a small throw-in stage thereby completing filling up to an objective filling weight ($W_0$), said method comprising the step of:

- measuring a fall time ($t\tau$) of the bulk material from an outlet opening to the filling object at said massive throw-in stage;
- measuring a flow rate (q) of the bulk material poured from the storage portion at said small throw-in stage;
- calculating a falling amount (Wh) thereof existing in air from just below the outlet opening of the storage portion closed by the opening/closing device up to the filling object according to $Wh = q \times t\tau$ at the small throw-in stage; and
- determining a timing in which the filling amount (W) of the bulk material filled in the filling object at said small throw-in stage reaches $W = W_0 - Wh$ to be a closing timing of the opening/closing device.

4. A method for filling bulk material according to claim 3, wherein a fall time of the bulk material for use in calculation of said falling amount is an average of fall times measured in a just nearby N cycle filling operation.

5. An apparatus for filling bulk material comprising:

- a storage portion for storing bulk material;
- an opening/closing device disposed on said storage portion for opening/closing an outlet opening of said storage portion;
- a weight detecting device for detecting a filling weight of the bulk material supplied from said storage portion to a filling object; and
- a control unit for controlling an opening/closing operation of said opening/closing device, filling a specified initial filling amount at a massive throw-in stage, and then filling a remaining filling amount at a small throw-in stage thereby completing filling up to an objective filling weight ($W_0$),
- said control unit receiving a result of detection from the weight detecting device and calculating a falling amount (Wh) existing in air from just below the outlet opening of the storage portion closed by the opening/closing device up to the filling object at said small throw-in stage, according to $Wh = q \times t\tau$ by measuring a fall time (t T) of the bulk material from the outlet opening of the storage portion to the filling object at said massive throw-in stage and further measuring a flow rate (q) of the bulk material poured from the storage portion at said small throw-in stage, and further determining a timing in which the filling amount (W) of the bulk material filled in the filling object at said small throw-in stage reaches $W = W_0 - Wh$ to be a closing timing of the opening/closing device.

6. An apparatus for filling bulk material according to claim 5, wherein a fall time of the bulk material for use in calculation of said falling amount is an average of fall times measured in a just nearby N cycle filling operation.

* * * * *